United States Patent
Ito et al.

(10) Patent No.: US 6,553,474 B2
(45) Date of Patent: Apr. 22, 2003

(54) DATA PROCESSOR CHANGING AN ALIGNMENT OF LOADED DATA

(75) Inventors: Hironobu Ito, Tokyo (JP); Hisakazu Sato, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/767,901

(22) Filed: Jan. 24, 2001

(65) Prior Publication Data

US 2001/0016898 A1 Aug. 23, 2001

(30) Foreign Application Priority Data

Feb. 18, 2000 (JP) .......................... 2000-040892

(51) Int. Cl.$^7$ .......................... G06F 15/00; G06F 12/02
(52) U.S. Cl. ........................ 711/201; 711/219; 712/4
(58) Field of Search .......................... 711/201, 3, 219; 712/4, 6, 2

(56) References Cited

U.S. PATENT DOCUMENTS

| 5,922,066 A | * | 7/1999 | Cho et al. .................. 712/204 |
| 5,944,775 A | * | 8/1999 | Satoshi ....................... 711/214 |
| 5,961,628 A | * | 10/1999 | Nguyen et al. ................. 712/6 |
| 6,266,758 B1 | * | 7/2001 | van Hook et al. ............. 712/20 |

FOREIGN PATENT DOCUMENTS

| JP | 4-018634 | 1/1992 |
| JP | 10-161927 | 6/1998 |

OTHER PUBLICATIONS

Jim Handy, "The Cache Memory Book," 1998 Academic Press, Second Edition pp. 156–158.*
J. Heinrich, MIPS R4000 Microprocessor User's Manual, pp. A102 to A107, "CPU Instruction Set Details," Second Edition.
DSP56000/DSP560001 Digital Signal Processor User's Manual Motorola, pp. 2–1 to 2–14, "Architectual Overview and Bus Structure".

* cited by examiner

*Primary Examiner*—Reginald G. Bragdon
*Assistant Examiner*—Paul Baker
(74) *Attorney, Agent, or Firm*—Oblon, Spivak, McClelland, Maier & Neustadt, P.C.

(57) ABSTRACT

A data processor in which a read operation, including misaligned data as operand data, can be performed in a single cycle. An alignment buffer having a register to hold data stored at one address in data memory is provided between the data memory and a data path unit. The alignment buffer outputs misaligned data by selecting misaligned data from data held in the register and data read from the data memory. The data held in the register is updated as word-aligned data is read out.

11 Claims, 44 Drawing Sheets

F / G. 4
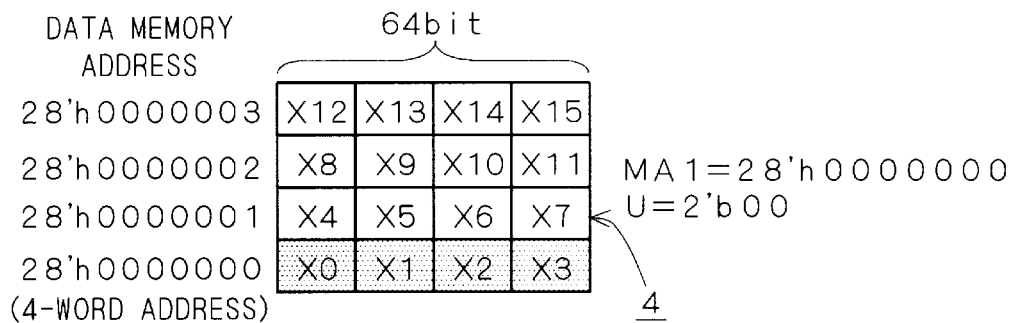
F / G. 5
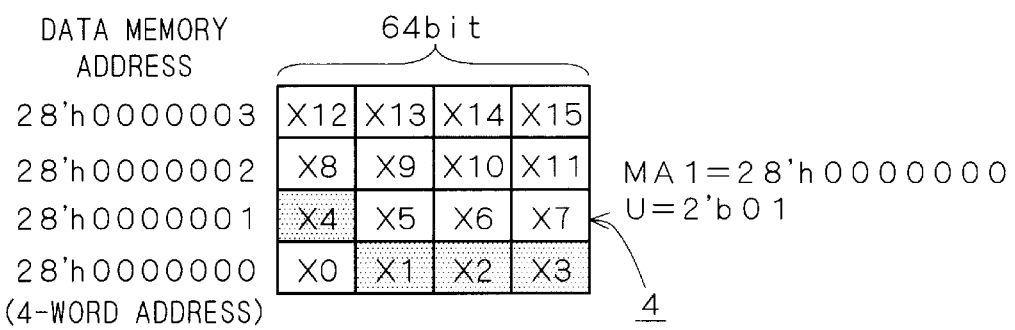
F / G. 6
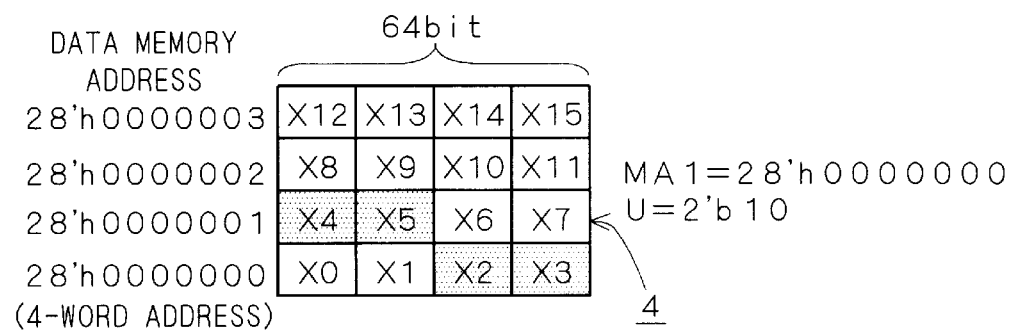

F I G. 10
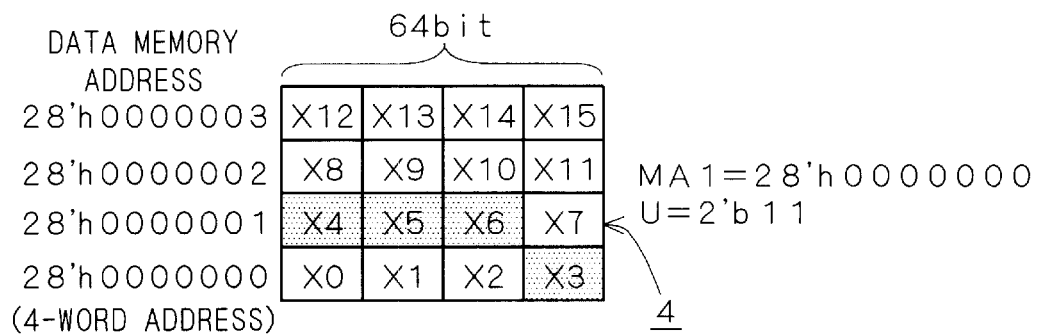
F I G. 11
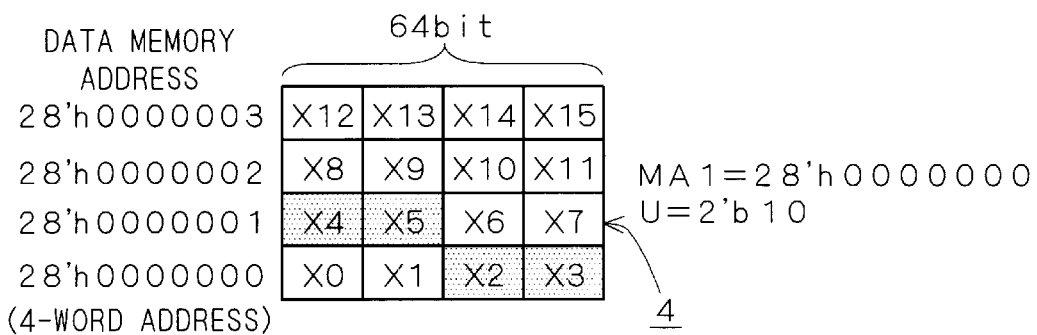
F I G. 12
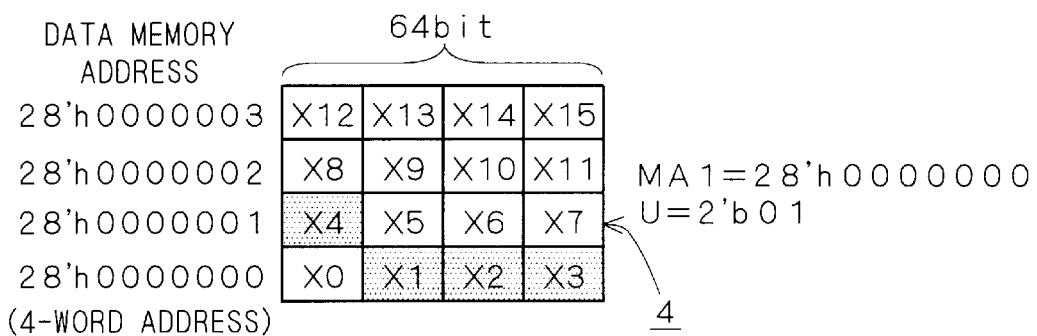

F I G. 27
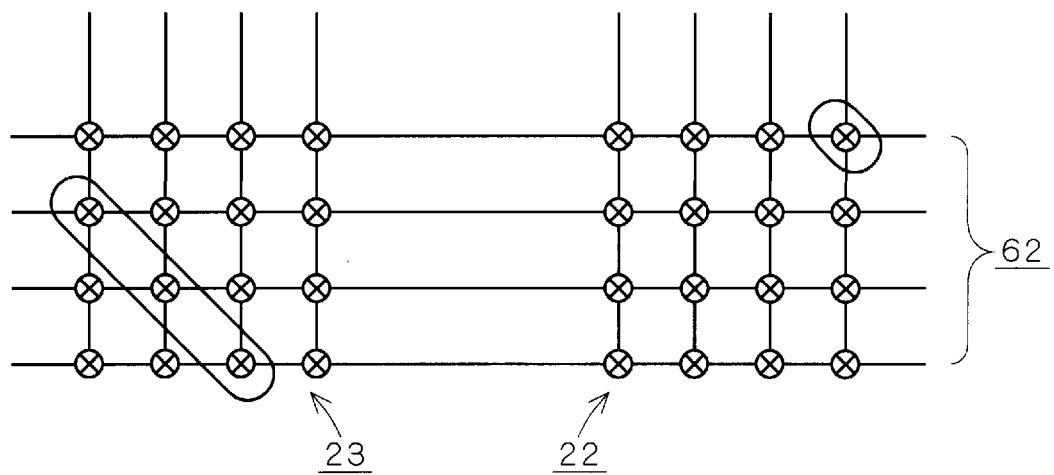

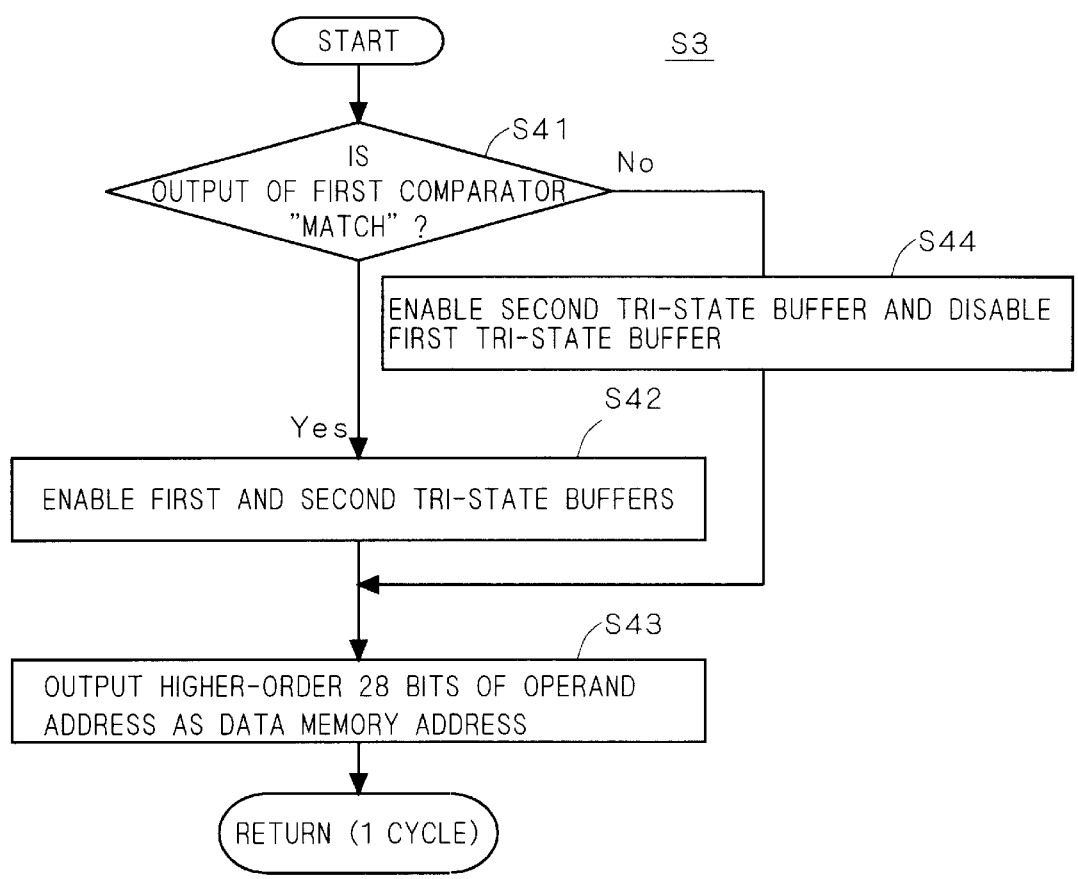
F I G. 29

LOWER-ORDER 2 BITS OF OPERAND ADDRESS = "00"

FIRST OR SECOND SWITCH GROUP 23, 22

LOWER-ORDER 2 BITS OF OPERAND ADDRESS = "01"
OUTPUT OF THIRD COMPARATOR = "MISMATCH"

LOWER-ORDER 2 BITS OF OPERAND ADDRESS = "11"
OUTPUT OF THIRD COMPARATOR = "MATCH"

WHEN LEADING POINTER REGISTER
SPECIFIES FIRST ADDRESS REGISTER

| OA | S0 | S1 | S2 | S3 |
|---|---|---|---|---|
| 0: | "0" | "0" | "0" | "0" |
| 1: | "1" | "0" | "0" | "0" |
| 2: | "1" | "1" | "0" | "0" |
| 3: | "1" | "1" | "1" | "0" |

WHEN LEADING POINTER REGISTER
SPECIFIES SECOND ADDRESS REGISTER

| OA | S0 | S1 | S2 | S3 |
|---|---|---|---|---|
| 0: | "1" | "1" | "1" | "1" |
| 1: | "0" | "1" | "1" | "1" |
| 2: | "0" | "0" | "1" | "1" |
| 3: | "0" | "0" | "0" | "1" |

LOWER-ORDER 2 BITS OF OPERAND ADDRESS = "01"

FIRST OR SECOND SWITCH GROUP 23, 22

LOWER-ORDER 2 BITS OF OPERAND ADDRESS = "10"

FIRST OR SECOND SWITCH GROUP 23, 22

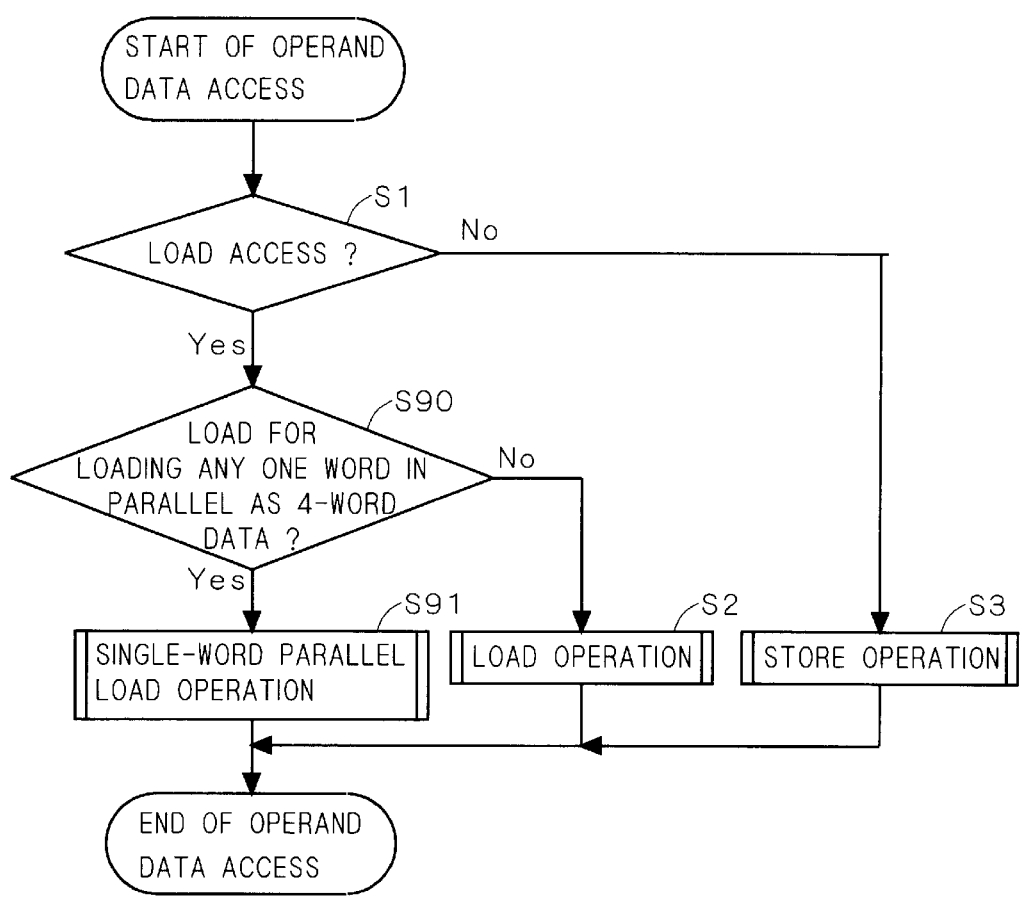
F I G. 54

F I G. 59
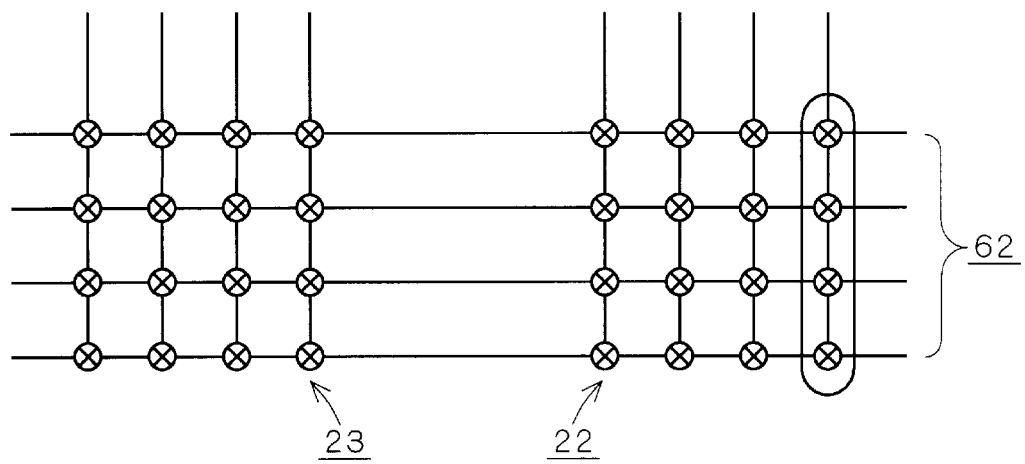

FIG. 67

$$Y0 = C0 \cdot X0 + C1 \cdot X1 + C2 \cdot X2 + \cdots + Cn \cdot Xn$$
$$Y1 = C0 \cdot X1 + C1 \cdot X2 + C2 \cdot X3 + \cdots + Cn \cdot Xn+1$$
$$y2 = C0 \cdot X2 + C1 \cdot X3 + C2 \cdot X4 + \cdots + Cn \cdot Xn+2$$
$$Y3 = C0 \cdot X3 + C1 \cdot X4 + C2 \cdot X5 + \cdots + Cn \cdot Xn+3$$

DATA PROCESSOR CHANGING AN ALIGNMENT OF LOADED DATA

BACKGROUND OF THE INVENTION

1. Field of the Invention

The present invention relates to a data processor and more particularly to an improvement that allows a shortening of access time to misaligned data (i.e., data crossing a word boundary) in data memory.

2. Description of the Background Art

As data processors dedicated to high-speed digital signal processing, digital signal processors (DSPs) using architectures suitable for data processing have a wide reputation. The DSPs perform data processing such as a product-sum operation at high speed. One example of the DSPs is the Motorola's DSP56000 (cf. "DSP56000/DSP56001 Digital Signal Processor User's Manual", 1990).

The DSP56000, which comprises two address pointers, two data memory, and a product-sum operation unit, concurrently performs loading of 2-word data from the two data memory specified by the two address pointers (e.g., loading of data and coefficient), updating of the two address pointers, and product-sum operations, thereby improving its throughput in performing the product-sum operations.

With recent growing needs for ever higher performance in applications, a large number of high-performance DSPs have been developed which have VLIW or SIMD architecture to achieve a high degree of parallelism in an arithmetic or logic operation. In order to enhance its throughput in performing a plurality of product-sum operations, such DSPs are configured to increase bandwidth between the data memory and the data path so that a plurality of operand data necessary for an arithmetic or logic operation can be loaded in a single cycle.

FIG. 65 is a block diagram of one of such DSPs, which is considered as a background art of the present invention. This processor comprises two 64-bit-wide data memories 80, 81 and a data path unit 86 which is configured to be able to perform four 16- by 16-bit product-sum operations in parallel on two 64-bit data DB read from both the data memories 80, 81.

Parallel processing of the product-sum operations is accomplished by SIMD (Simple Instruction Multiple Data stream) architecture, in which four 16- by 16-bit product-sum operations are performed in accordance with a single product-sum arithmetical instruction holding two 64-bit operand data. A control unit 83 reads out an instruction ID from an instruction memory 82 using an instruction address IA specified and issues a control signal CS to each component of the processor so that the respective components operate in accordance with the instruction ID.

The data memories 80, 81 are configured to store four words at each line (one word is 16 bits long), from each of which four words of data DB on the same line which is specified by an operand address OA from an operand-address generation unit 84, 85 can be read out in a single cycle. In each memory space of the data memories 80, 81, the boundary between 4-word data aligned in a line is called a word boundary.

The hardware of the conventional data processors generally does not support access to data which is not aligned on but crossing the word boundary (the data is hereinafter referred to as "misaligned data"; inversely, data aligned on, i.e., not crossing, the word boundary is referred to as "word-aligned data"). Even if supported, access to misaligned data requires the execution of two or more instructions and thus cannot be accomplished with a throughput of a single cycle. The processor in FIG. 65 corresponds to the latter case.

Consider a case where the above DSP is used as a FIR filter (Finite Impulse Response filter, which is a kind of digital filter) by exploiting its advantage of being able to perform four product-sum operations in parallel. Since FIR filters require misaligned data, product-sum operations cannot be accomplished with a throughput of a single cycle. Thus, it is difficult to speed up FIR processing.

To form an FIR filter, for example, the data memories 80, 81 store strings of data X and strings of coefficients C, respectively, as shown in FIG. 66 and product-sum operations as shown in FIG. 67 are performed by reading out such data X and coefficients C. The data X is input data to the FIR filter and the data Y is output data therefrom. Parallel processing of the four 16- by 16-bit product-sum operations in FIG. 67 results in high operation speed.

The execution of the operations in FIG. 67 requires the reading of misaligned data X, such as 4-word data from X1 to X4, from the data memory 80. When such misaligned data is operand data, the processor in FIG. 65 has to load read data from the data memory 80 alternately into two 64-bit registers, and then to fetch four out of the eight 16-bit data stored in the two registers, placing them in another register for sorting. Therefore, two or more cycles are necessary for the performance of the product-sum operations.

Even such data processors as using MIPS architecture which supports access to misaligned data still require two or more cycles for loading of misaligned data. Accordingly, product-sum operations can be performed only once in two cycles, which increases processing time.

SUMMARY OF THE INVENTION

A first aspect of the present invention is directed to a data processor receiving data from a memory being capable of storing N ($\geq 2$) words of data at each address and processing the data. The data processor comprises: M ($\geq 1$) registers each being capable of holding one of the addresses and N words of data; a selector for selecting and outputting N consecutive words of data specified on a word-by-word basis from among data held in the M registers and data read from the memory; and a controller for, when the N consecutive words of data have a portion which is not held in any of the M registers, reading out N words of data containing the portion from the memory and, when the M registers include a no-data-holding register which does not hold any of the N consecutive words of data, updating values of the no-data-holding register with N words of data read from the memory and its address.

According to a second aspect of the present invention, in the data processor of the first aspect, the M registers include two or more registers.

According to a third aspect of the present invention, in the data processor of the first or second aspect, the controller writes N words of data into the memory at a specified address in response to a write instruction and disables all of the M registers so that the M registers are equivalent to those which do not hold any address and data in the memory.

According to a fourth aspect of the present invention, in the data processor of the first or second aspect, the controller writes N words of data into the memory at a specified address in response to a write instruction and, when the M registers include a register holding the specified address, updates N words of data held in that register with the N words of data written into the memory.

According to a fifth aspect of the present invention, in the data processor of either of the first to fourth aspects, the controller reads out N words of data which is stored at a specified address in the memory, in response to an aligned-data read instruction; and the selector outputs the N words of data read from the memory in response to the aligned-data read instruction.

According to a sixth aspect of the present invention, in the data processor of either of the first to fifth aspects, the controller reads out N words of data containing a specified word from the memory, in response to a single-word parallel read instruction; and the selector outputs N words in parallel, each being the specified word included in the N words of data read from the memory, in response to the single-word parallel read instruction.

According to a seventh aspect of the present invention, in the data processor of either of the first to sixth aspects, the controller includes another register and, when updating a value of either of the M registers, computes an address contiguous to the one to be held in the updated register and loads the computed address into the another register.

According to an eighth aspect of the present invention, the data processor of the first aspect further receives data from another memory capable of storing N ($\geq$2) words of data at each address. The data processor further comprises: other M ($\geq$1) registers each being capable of holding one of the addresses of the another memory and N words of data; another selector for selecting and outputting other N consecutive words of data specified on a word-by-word basis from among data held in the other M registers and data read from the another memory; another controller for, when the other N consecutive words of data have another portion which is not held in any of the other M registers, reading out N words of data containing the another portion from the another data memory and, when the other M registers include a no-data-holding register which does not hold any of the other N consecutive words of data, updating values of the no-data-holding register with the N words of data read from the another memory and its address; and an operation unit for performing an arithmetic or logic operation using both data output from the selector and the another selector.

A ninth aspect of the present invention is directed to a data processor receiving data from a memory being capable of storing N ($\geq$2) words of data at each address and processing the data. The data processor comprises: a controller for reading out N words of data which is stored at an address containing a specified word from the memory; and a selector for outputting N words in parallel, each word being the specified word included in the N words of data read from the memory.

In the data processor of the first aspect, when the N consecutive words of data specified have a portion which is not held in any of the M registers, N words of data at an address containing this portion are read out from the memory. At this time, if the M registers include a no-data-holding register, the value of the no-data-holding register is updated with the N words of data read from the memory and its address.

The N consecutive words of data to be specified may be either word-aligned or misaligned data in the memory, and the word addressing may proceed in either a direction of increasing the word address (postincrement) or a direction of decreasing the word address (postdecrement). In any case, when the width of update (increment or decrement size) between specified words is within predetermined limits depending on the number of registers (=M), data stored at one address containing the N consecutive words of data (for word-aligned data) or data stored at least one of two addresses containing the N consecutive words of data (for misaligned data) is held in any of the M registers, except in the case of initial word addressing. Accordingly, only a single read operation from the memory should be enough for each word addressing except for initial word addressing.

In some cases, the read data may be held in any of the M registers; but the selector, which can directly select the read data, does not have to select data from such a register after the read data is held. Thus, one clock cycle should be enough for the selector to output N consecutive words for each word addressing except for initial word addressing. The technique disclosed in Japanese Patent Application Laid-open No. 10-161927 (1998) is intended only for access to word-aligned data; therefore, even though bringing efficiency to word-aligned data access, it fails to achieve the aforementioned effect of the present invention, i.e., improvement in data access including misaligned data.

The data processor of the second aspect, which comprises a plurality of registers, is widely adaptable to various widths of update within plus or minus four words. In addition, when the width of update is within plus or minus one word, only a single read operation from the memory should be enough for every N addressing. This reduces power consumption in the memory.

The data processor of the third aspect disables all the registers when data is written into the memory. This maintains coherency between the values of the memory and the registers.

The data processor of the fourth aspect, when writing data into the memory, updates data in the register with the write data, thereby maintaining coherency between the values of the memory and the register. Besides, since no register is disabled, only one access to the memory should be enough for the first access immediately after the restart of the load operation.

The data processor of the fifth aspect can selectively perform the load operation and the aligned-data load operation. Since the values of the registers are not updated during the aligned-data load operation, only one access to the memory should be enough for the first access immediately after the restart of the load operation which was interrupted by the aligned-data load operation.

The data processor of the sixth aspect can perform the single-word parallel load operation. When used as a FIR filter, this processor can reduce the memory capacity for multiplier coefficients by 1/N.

The data processor of the seventh aspect, when updating any of the values of the M registers, previously computes an address contiguous to the one to be held in the updated register and stores it into another register. The address held in another register will be used in the next read operation from the memory. This eliminates the need for calculating a new address, thus shortening processing time for reading.

The data processor of the eight aspect can perform an arithmetic or logic operation using several kinds of numeric values and is thus suitable as a FIR filter.

The data processor of the ninth aspect can perform the single-word parallel load operation. When used as a FIR filter, this processor can reduce the memory capacity for multiplier coefficients by 1/N.

An object of the present invention is to provide a data processor capable of reading misaligned data as operand data in a single cycle, thereby speeding up data processing.

A technique related to that of the present invention is disclosed for example in Japanese Patent Application Laid-open No. 10-161927 (1998).

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 to 13 are explanatory diagrams of the operations of the alignment buffer of the first preferred embodiment.

FIGS. 20 to 27 are explanatory diagrams of the operations of a data selector of the first preferred embodiment.

FIG. 29 is a flowchart of the procedure of a buffer controller of a second preferred embodiment.

FIGS. 54 and 55 are flowcharts of the procedure of a buffer controller of a fifth preferred embodiment.

FIGS. 56 to 59 are explanatory diagrams of the operations of a data selector of the fifth preferred embodiment.

FIG. 67 is an explanatory diagram of an example of an arithmetic or logic operation according to the background art.

DESCRIPTION OF THE PREFERRED EMBODIMENTS

1. First Preferred Embodiment

A data processor of a first preferred embodiment comprises alignment buffers, each having a register to hold data stored at one address in data memory, between data memory and a data path unit. The alignment buffers output word-aligned/misaligned data by selecting operand data from among data held in their registers and data read from the data memory.

In reading word-aligned data, data in the register is updated after each read operation except in cases where the register has already held the read data. In reading misaligned data, only if the register does not hold any part of the read data, the register value is updated at the time either of two word-aligned data containing misaligned data is read out.

As long as the difference between operand addresses for consecutive read operations is within plus or minus one on a data-memory-address basis, either of word-aligned and misaligned data can be obtained through one access to the data memory. Thus, consecutive read operations for reading operand data including misaligned data can be accomplished with a throughput of a single cycle.

1–1. Overall Configuration of Data Processor

Figure 1:
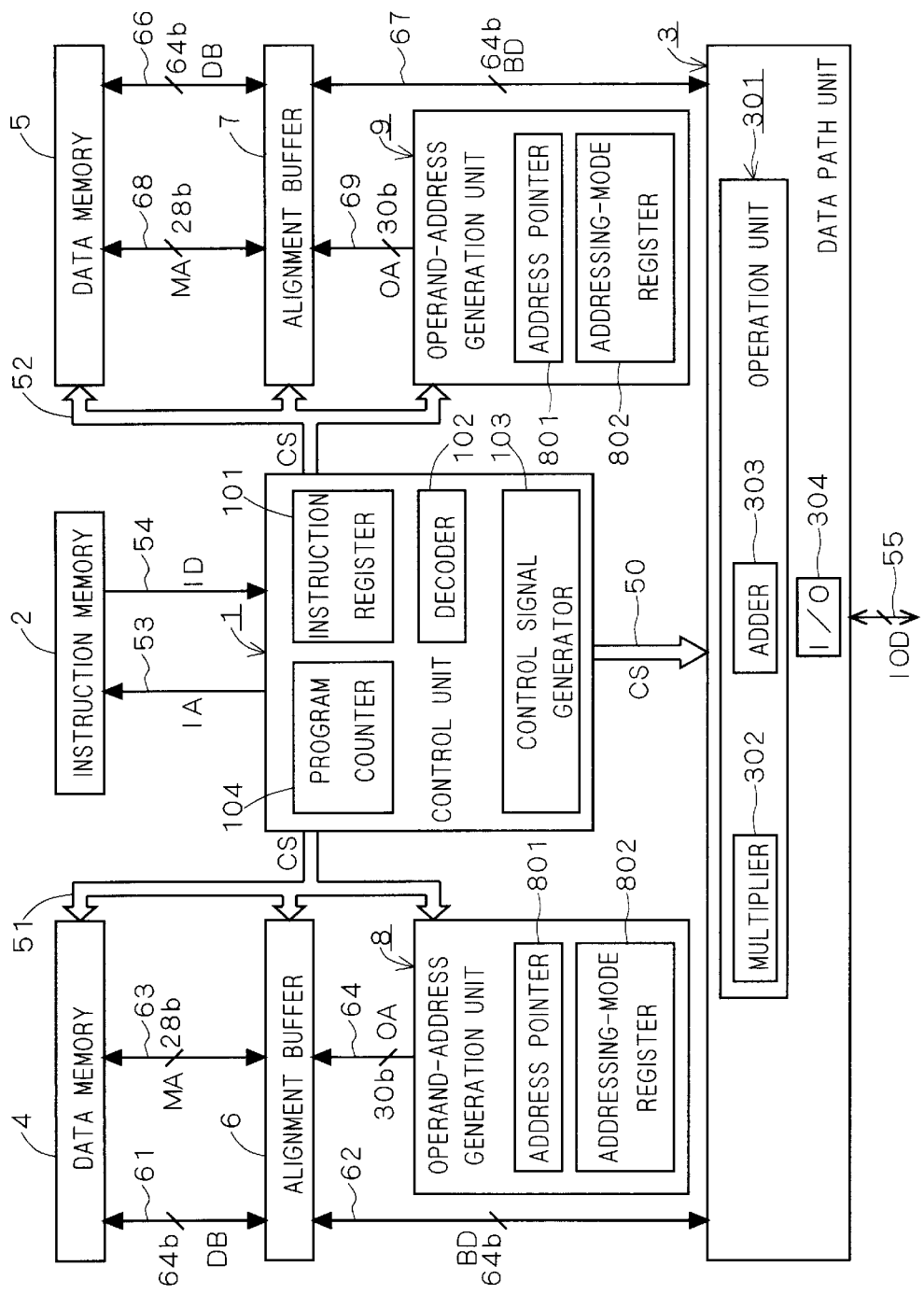
FIG. 1 is a block diagram of a data processor of a first preferred embodiment.

FIG. 1 is a block diagram showing a configuration of the data processor of the first preferred embodiment. This processor comprises a control unit 1, an instruction memory 2, a data path unit 3, two data memories 4, 5, two alignment buffers 6, 7, and two operand-address generation units 8, 9.

The instruction memory 2 for storing instructions ID outputs one of the instructions ID corresponding to an instruction address IA to the control unit 1 over a data bus 54. The instruction address IA is sent from the control unit 1 on an address bus 53. The control unit 1 controls each component of the processor so that the components operate in accordance with the fetched instruction ID. After stored in an instruction register 101, the fetched instruction ID is decoded by a decoder 102, and the decoded result enters a control signal generator 103.

The control signal generator 103 generates, based on the decoded result, a control signal CS for controlling the data path unit 3, the data memories 4, 5, the alignment buffers 6, 7, and the operand-address generation units 8, 9 and sends the signal CS to each of the components over control buses 50, 51, 52. A program counter 104 holds the instruction address IA of the instruction ID being executed as a program counter value and also performs processing such as pipeline control in accordance with the execution of the instruction ID, updating of the program counter value, calculation of the next instruction address IA to be outputted, and output of the calculated instruction address IA to the instruction memory 2.

Each of the data memories 4, 5 is 64-bit-wide data memory, from and to which up to 4-word data (one word is 16 bits long) specified by a data memory address MA which is received from the alignment buffer 6 or 7 can be read and up to eight bytes of data can be written. The data memory address MA is a 4-word address. The read/write operations from and to the data memories 4, 5 are controlled by a read/write signal RW (not shown) which is included in the control signal CS from the control unit 1. An 8-bit byte control signal (not shown) included as well in the control signal CS allows writing to any desired byte.

The data path unit 3 comprises an operation unit 301 including a multiplier 302 and an adder 303, so it can concurrently perform four 16- by 16-bit product-sum operations for example as shown in FIG. 67 on two 64-bit data transmitted from the data memories 4, 5 through the alignment buffers 6, 7. Parallel processing of product-sum operations in the data path unit 3 is accomplished by SIMD (Single Instruction Multiple Data stream) architecture, in which four 16- by 16-bit product-sum operations are performed in accordance with a single product-sum arithmetical instruction holding two 64-bit operand data. The read/write data from and to the data memories 4, 5 is also exchanged as I/O data IOD with external devices through an I/O interface 304 and a data bus 55.

The operand-address generation units 8, 9 comprise address pointers 801 corresponding to the data memories 4, 5 and output operand addresses OA to the alignment buffers 6, 7 in a word address format (i.e., on a word-by-word basis). The address pointers 801 are updated in accordance with the contents of addressing-mode registers 802. The addressing-mode registers 802 hold an address pointer update mode (i.e., postincrement or postdecrement) and the increment or decrement size. "Postincrement" (or "postdecrement") is the mode of incrementing (or decrementing) the operand address OA by a predetermined interval which is the increment (or decrement) size.

The alignment buffers 6, 7 generate data memory addresses MA based on the operand addresses OA received through 30-bit-wide address buses 64, 69 and on the control signal CS sent from the control unit 1. The data memory addresses MA are then transferred to the data memories 4, 5 over 28-bit-wide address buses 63, 68. The read/write data is transferred as data DB between the data memories 4, 5 and the alignment buffers 6, 7 on 64-bit-wide data buses 61, 66. Further, data BD is transferred between the alignment buffer 6, 7 and the data path unit 3 on 64-bit-wide data buses 62, 67.

1–2. Configuration of Alignment Buffer

Figure 2:
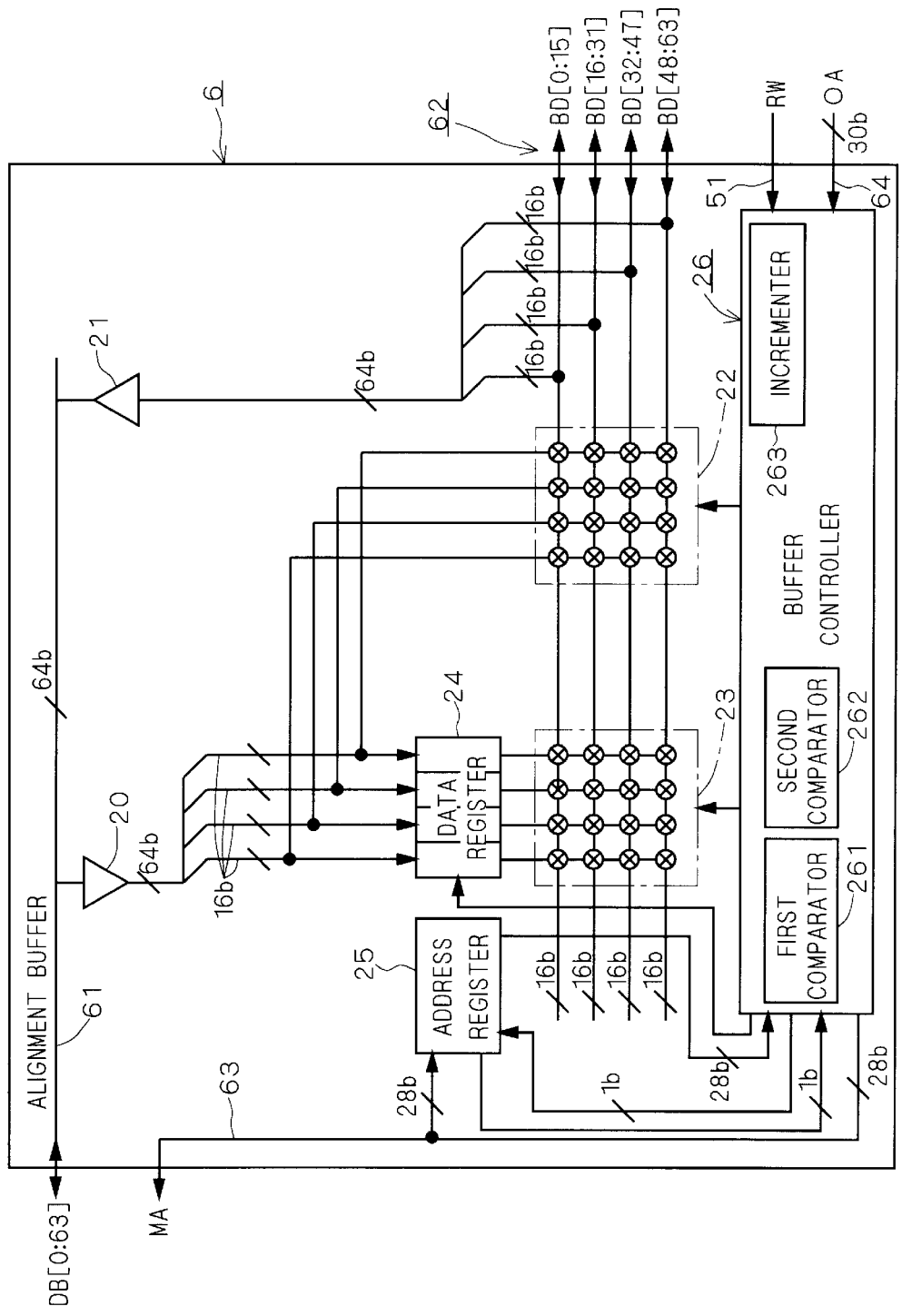
FIG. 2 is a block diagram of an alignment buffer of the first preferred embodiment.

FIG. 2 is a block diagram showing a configuration of the alignment buffer 6 as the representative of the alignment buffers 6, 7 of the same configuration. The alignment buffer 6 comprises a first tri-state buffer 20, a second tri-state buffer 21, an address register 25, a data register 24, a first switch group 23, a second switch group 22, and a buffer controller 26. The first switch group 23 and the second switch group 22 form a data selector.

The alignment buffer 6 is connected to the data memory 4 by the bidirectional, 64-bit-wide data bus 61 and connected to the data path unit 3 by the bidirectional, 64-bit-wide data bus 62. These data buses 61, 62 are connected to each other by the first and second tri-state buffers 20, 21.

The 64-bit data DB read from the data memory 4 (referred to as read data) is fed to the first tri-state buffer 20 over the data bus 61, divided into four 16-bit buses, and sent to the data bus 62 as data BD through the second switch group 22 consisting of 16 switches. The 64-bit data DB fed to the first tri-state buffer 20 is also sent to the 64-bit data register 24. The value of the data register 24 is sent to the data bus 62 through the first switch group 23 consisting of 16 switches. The 64-bit data BD to be written into the data memory 4 (referred to as write data) is outputted from the data path unit 3 to the data bus 62 and sent to the data bus 61 through the second tri-state buffer 21.

The address register 25 is 29 bits in length (width of data memory address+1 bit), the lower-order 28 bits of the same holding the address of data held in the data register 24 (i.e., data memory address) and the most significant bit being a valid/invalid bit which indicates whether the data in the data register 24 is valid or invalid.

The buffer controller 26 performs processing such as updating of the values of the data register 24 and the address register 25, control of the first and second switch groups 23, 22, control of the first and second tri-state buffers 20, 21, and generation of the data memory address or 28-bit-wide 4-word address which is to be outputted to the data memory 4. The buffer controller 26 handles these controls based on the operand address OA and the read/write signal RW which is part of the control signal CS sent from the control unit 1. The address register 25 fetches the data memory address MA from the buffer controller 26.

Figure 3:
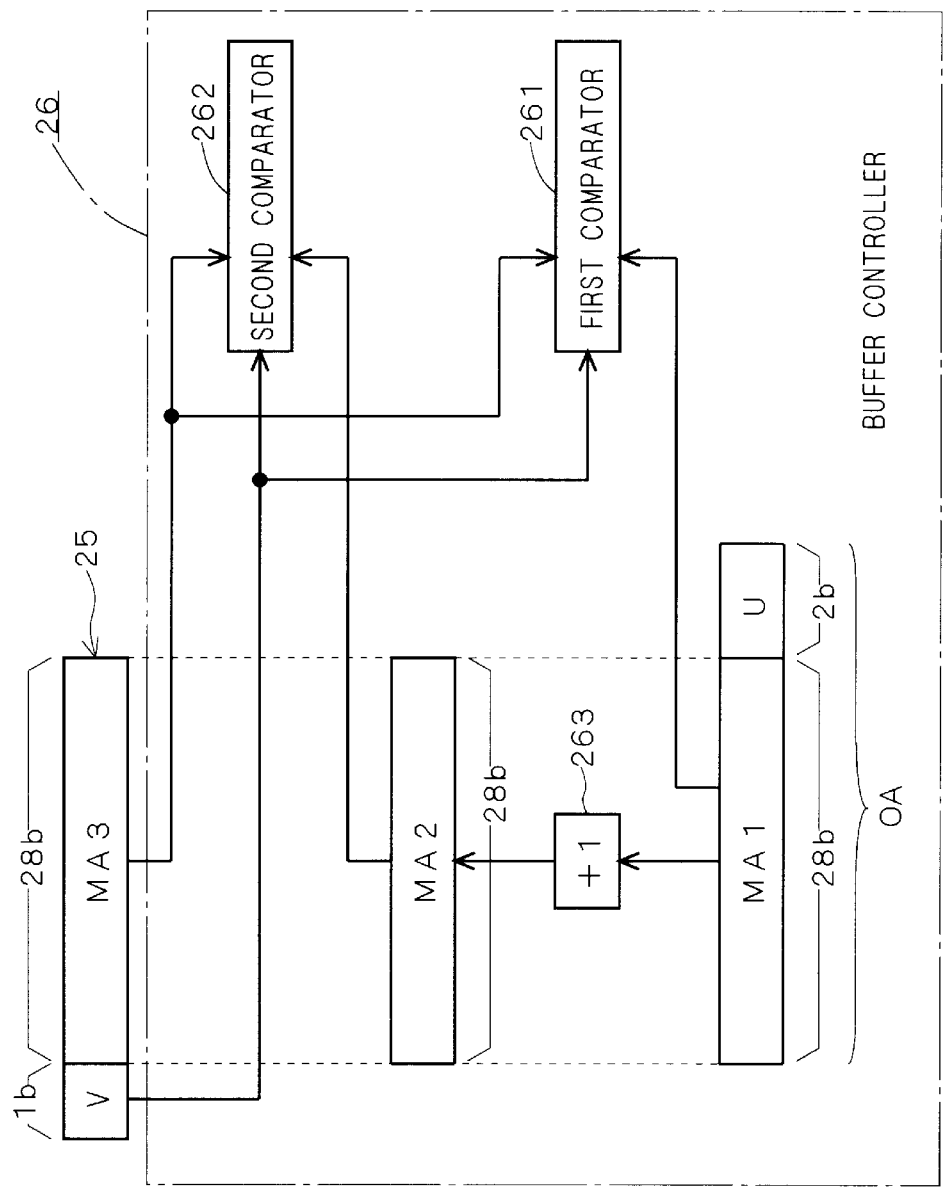
FIG. 3 is an explanatory diagram of the operations of a buffer controller of the first preferred embodiment.
Figure 7:
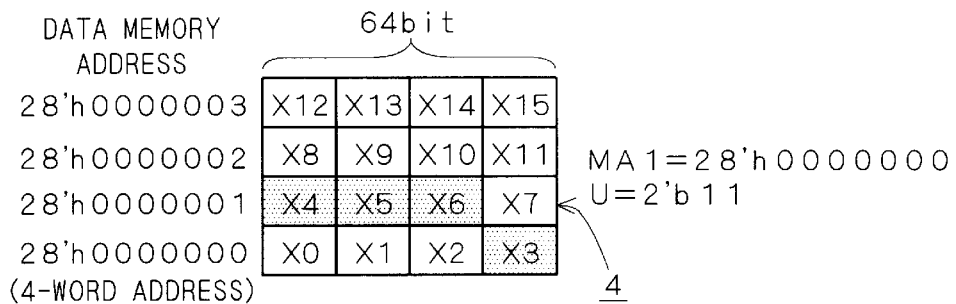
Figure 8:
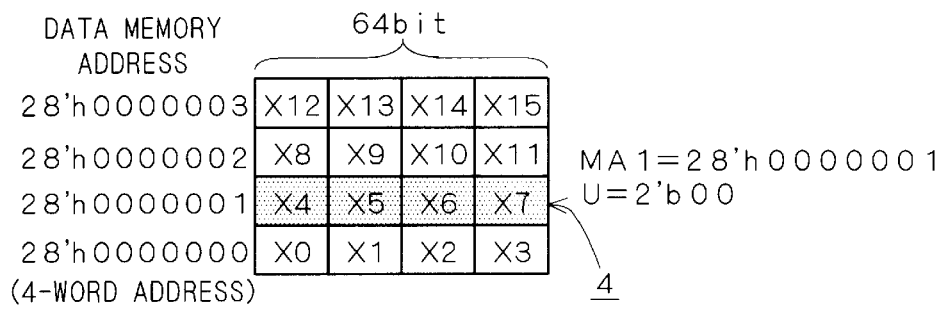
Figure 9:
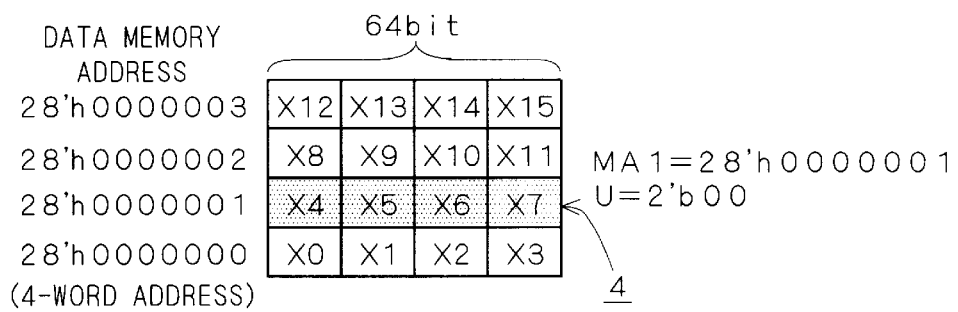
Figure 13:
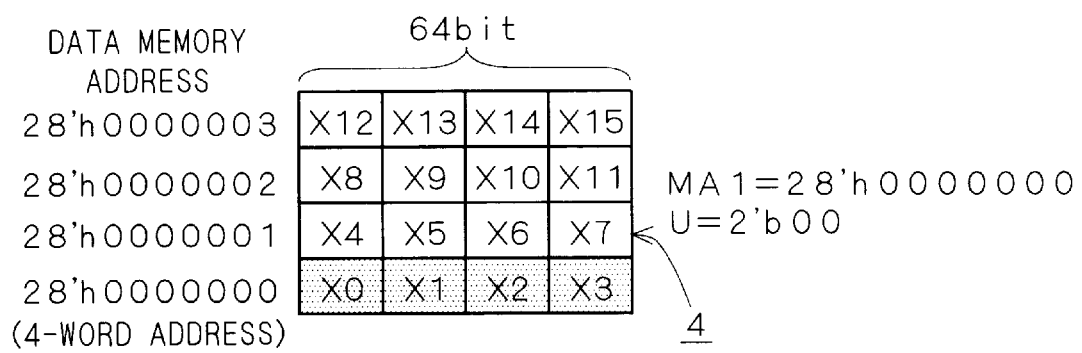

The buffer controller 26 comprises a first comparator 261, a second comparator 262, and an incrementer 263. As shown in FIG. 3, the first comparator 261 makes a comparison between higher-order 28 bits MA1 of the operand address OA and lower-order 28 bits MA3 of the address register 25; and the second comparator 262 makes a comparison between a value MA2 obtained by incrementing the higher-order 28 bits MA1 of the operand address OA by 1 and the lower-order 28 bits MA3 of the address register 25.

When the most significant bit or valid/invalid bit V of the address register 25 indicates an "invalid", both the first comparator 261 and the second comparator 262 output a "mismatch" irrespective of their comparison results. That is, with the valid/invalid bit V indicating an "invalid", the address register 25 and the data register 24 are treated in such a manner as if they hold no address or data in the data memory 4. After the registers are disabled, the valid/invalid bit V continues to indicate an "invalid" until the register values are updated. In this case, either of the value MA2 generated by the incrementer 263 and the higher-order 28 bits MA1 is selected by a selector (not shown) and outputted as the data memory address MA.

1–3. Operations of Alignment Buffer

Referring back to FIG. 2, the operation of each component of the alignment buffer 6, which is controlled by the buffer controller 26, depends on the type of operand access to be executed, the outputs of the first and second comparators 261, 262, and the two least significant bits U of the operand address OA. There are two types of operand access: the one according to the load instruction and the one according to the store instruction. The buffer controller 26 receives instructions as to the type of operand access through the read/write signal RW from the control unit 1.

If the data register 24 holds at least one word in the 4-word data specified by the operand address OA, the output of either of the first and second comparators 261, 262 becomes a "match". If the data register 24 holds none of the four words specified by the operand address OA, the outputs of both the first and second comparators 261, 262 become a "mismatch".

For misaligned data access, if word data not held in the data register 24 is found in the next four words to those specified by the higher-order 28 bits MA1 of the operand address OA, the output of the first comparator 261 becomes a "match"; if word data not held in the data register 24 is found in four words antecedent to those specified by the higher-order 28 bits MA1 of the operand address OA, the output of the second comparator 262 becomes a "match".

The lower-order two bits U of the operand address OA indicate whether the operand data is word-aligned data or misaligned data in the space in the data memory 4.

Figure 66:
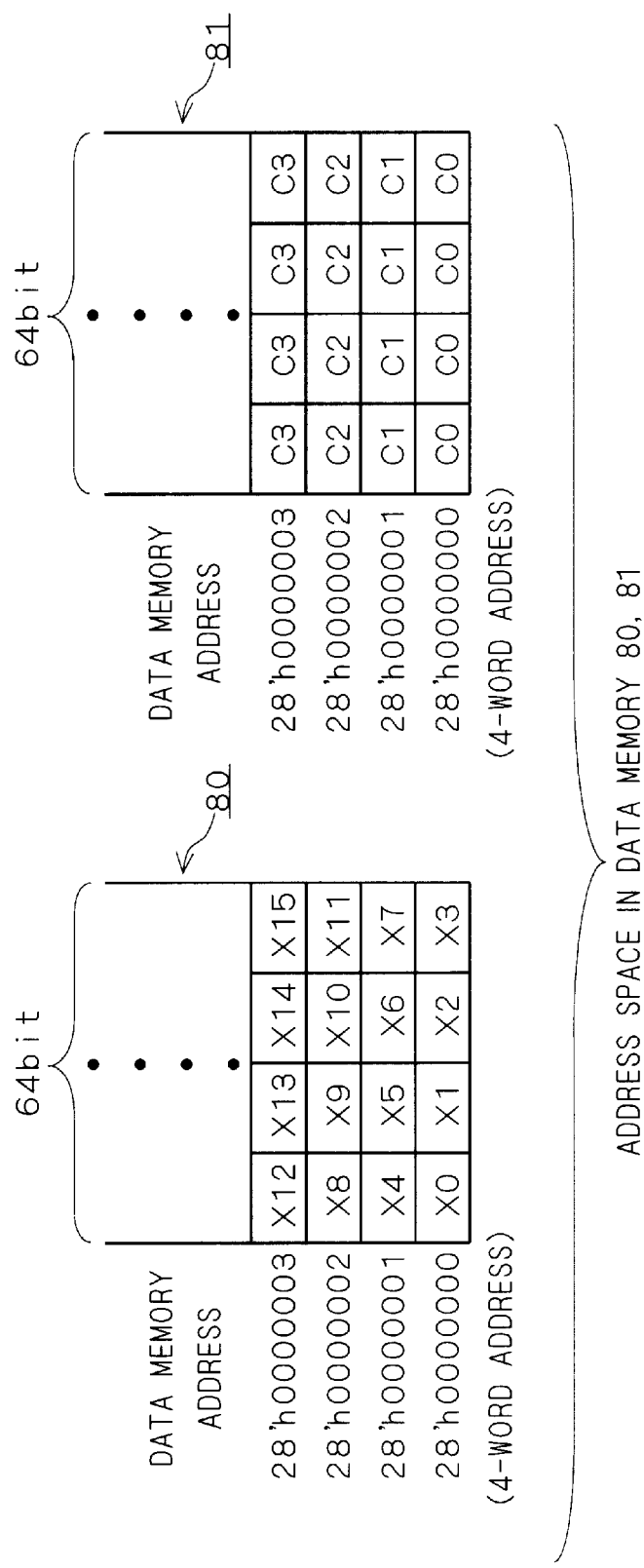
FIG. 66 is an explanatory diagram of data in data memory of the background art.

For operand data access according to the load instruction, the alignment buffer 6 selects and outputs 4-word data specified by the operand address OA from data in the data memory 4 in such manners as illustrated in FIGS. 4 to 13. In the examples of FIGS. 4 to 13, the data memory 4 stores data X in the same form as the data memory 80 in FIG. 66. Four consecutive words of data giving the hatching correspond to 4-word data specified by the operand address OA and also correspond to 4-word data outputted from the alignment buffer 6.

FIGS. 4 to 8 show the case where the operand address OA is updated in one word postincrements, and FIGS. 9 to 13 show the case where the operand address OA is updated in one word postdecrements. In either case, the operand address OA addresses four consecutive words by specifying a word corresponding to the head of such consecutive words (hereinafter referred to as an "head word"). That is, the higher-order 28 bits MA1 of the operand address OA specify a data memory address MA addressing four words containing the head word (hereinafter referred to as a "head address"), and the lower-order two bits U specify the location of the head word in four words addressed by the data memory address MA.

In the example of FIG. 4 corresponding to postincrement, the head word of four consecutive words is located at data X0 and the word corresponding to the end point thereof (hereinafter referred to as an "end word") is located at data X3. In the example of FIG. 10 corresponding to postdecrement, the head word is located at data X3 and the end word is located at data X6.

When four consecutive words are word-aligned data, the head address matches a data memory address MA addressing four words containing the end word (hereinafter referred to as an "end address"). When four consecutive words are misaligned data, the head address and the end address do not match. FIGS. 4, 8, 9, and 13 show the examples that four consecutive words specified are word-aligned data, and FIGS. 5 to 7 and 10 to 12 show the examples that they are misaligned data.

In reading word-aligned data, unless the data register 24 holds 4-word data stored at the head address, the alignment buffer 6 reads out data stored at the origin or end address (the head address equals the end address for word-aligned data) as the operand address OA is updated. The value of the data register 24 is updated with the 4-word read data. The data read from the data memory 4 is then transferred by the second switch group 22 to the operation unit 301 in the data path unit 3.

When the data register 24 holds 4-word data stored at the head address, the value of the data register 24 is sent to the data path unit 3 by the first switch group 23 without data read from the data memory 4.

In reading misaligned data, if the data register 24 holds either of data stored at the head address or data stored at the end address, the alignment buffer 6 reads out data stored at the other address (e.g., end address if the data register 24 holds data stored at the head address) from the data memory 4. At this time, the value of the data register 24 is not updated. Then, the first and second switch groups 23, 22 select four consecutive words of data specified by the operand address OA from among the 4-word data read from the data memory 4 and the 4-word data held in the data register 24, and transfer the selected data to the operation unit 301 in the data path unit 3.

When the data register 24 hold neither data stored at the head address nor data stored at the end address, in a first cycle, the alignment buffer 6 reads out data stored at the head address from the data memory 4 and updates the value of the register 24 with the 4-word read data. In the next cycle, data stored at the end address is read out from the data memory 4, but the value of the register 24 is not updated. Then, the first and second switch groups 23, 22 select four consecutive words of data specified by the operand address OA from among the data read in the second cycle and the data held in the first cycle, and transfer the selected data to the operation unit 301 in the data path unit 3.

If the difference between the operand addresses OA is within plus or minus one word (i.e., either of −1, 0, or +1) in two consecutive read operations, the data register 24 always holds either data stored at the head address or data stored at the end address in the second read operation. Even if the second read operation is to read misaligned data, only one access to the data memory 4 should be enough; therefore, an arithmetic or logic operation on operand data including misaligned data can be accomplished with a throughput of a single cycle. This improves the speed of data processing.

1–4. Operations of Buffer Controller

Figure 14:
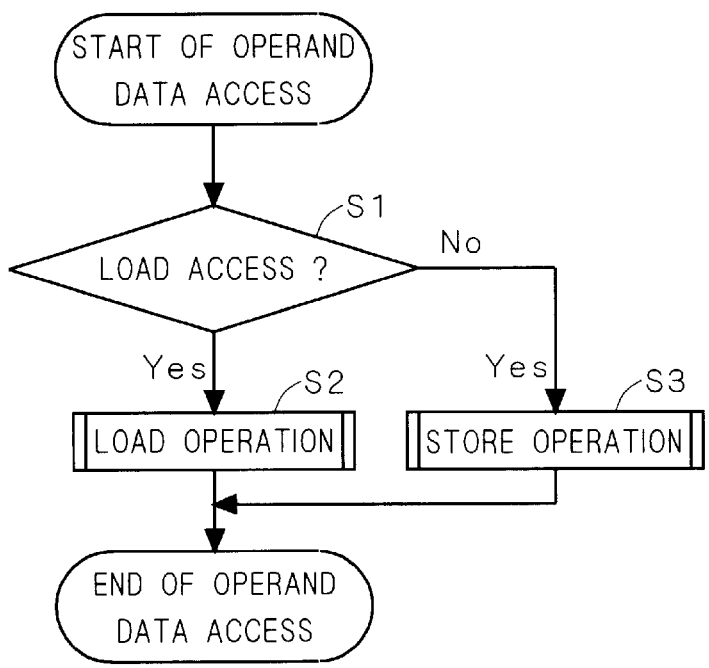
FIGS. 14 to 19 are flowcharts of the procedure of the buffer controller of the first preferred embodiment.

FIGS. 14 to 19 are flowcharts of control procedures by the buffer controller 26. As shown in FIG. 14, when operand data access starts, whether the access is a load access according to the load instruction or not is determined in step S1. The buffer controller 26 makes this judgment based on the read/write signal RW. For load access, a load operation is performed (step S2). For store access, a store operation is performed (step S3). At the completion of either operation, the operand access process completes. As the load operation S2 is repeated, the operand address OA is incremented (or decremented) by 1. This accomplishes load operations in one word postincrements (or postdecrements).

Figure 18:
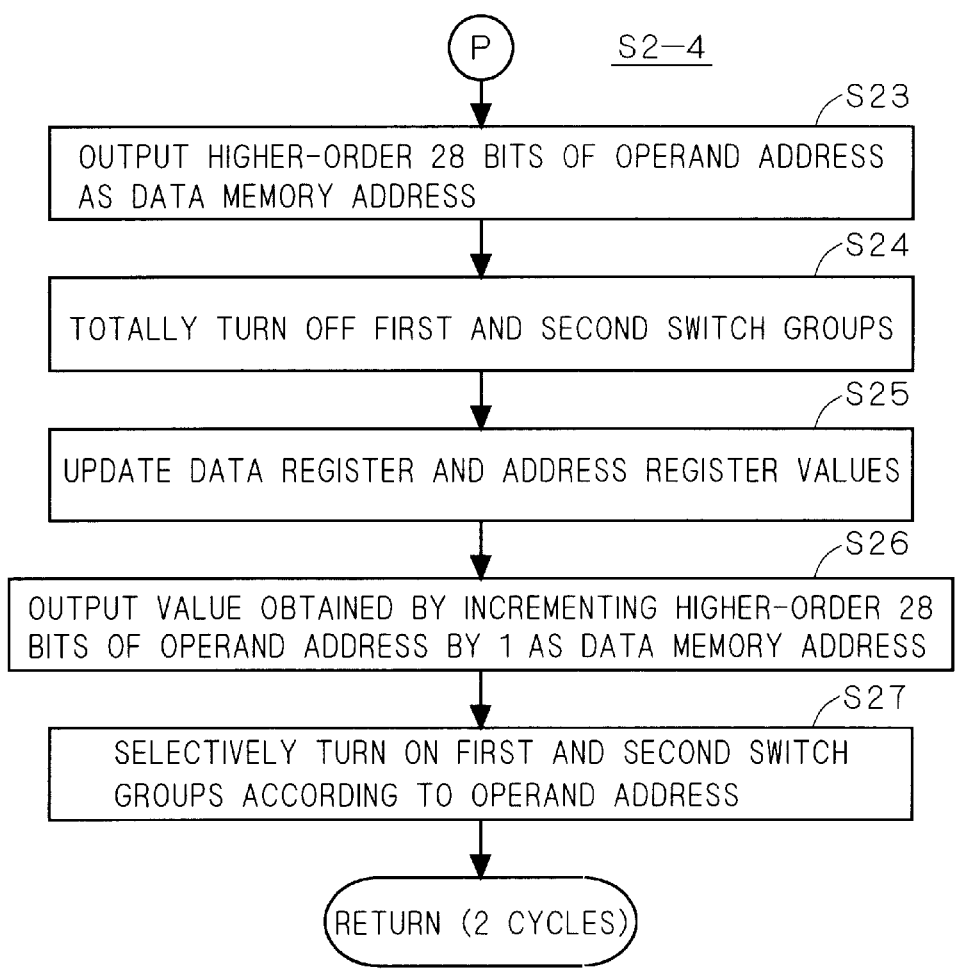
Figure 19:
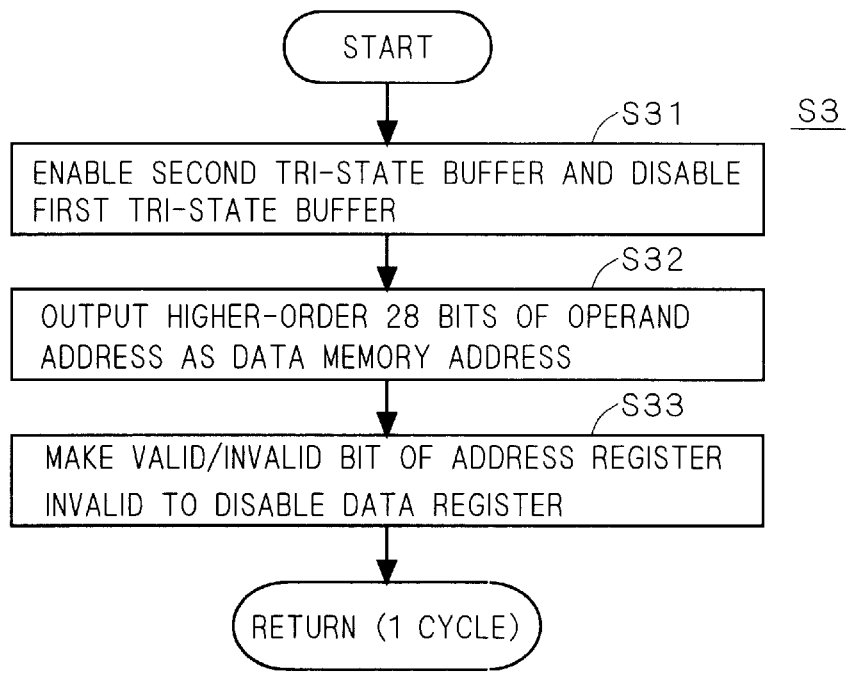

The load operation (step S2) is performed in accordance with the flowcharts of FIGS. 15 to 18, and the store operation (step S3) is performed in accordance with the flowchart of FIG. 19.

When the load operation starts, the buffer controller 26 enables the first tri-state buffer 20 and disables the second tri-state buffer 21 (step S11). Then, whether four words specified by the operand address OA are aligned on the word boundary in the data memory 4 is determined according to whether the lower-order two bits U of the operand address OA are 2'b00 (step S12).

Figure 20:
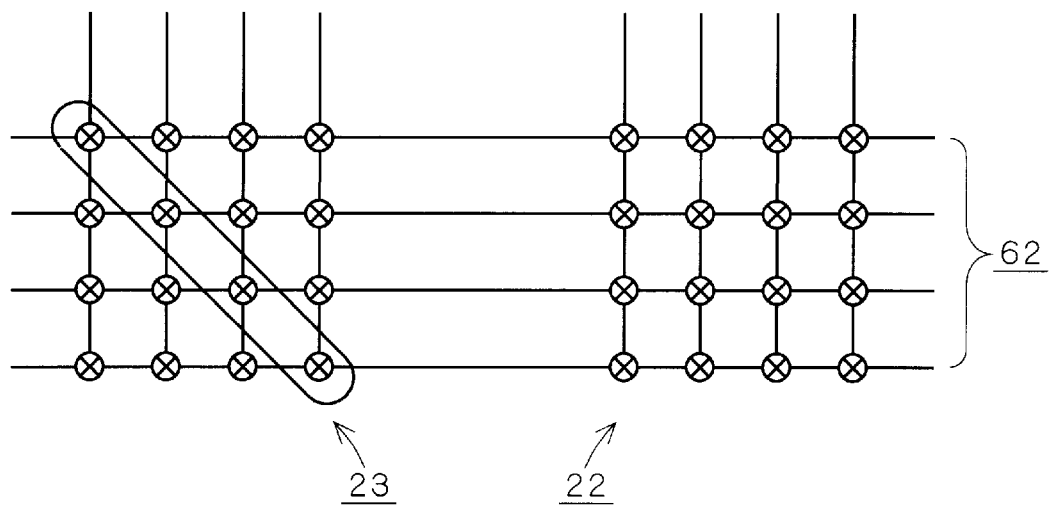

When the four words specified by the operand address OA is judged as word-aligned data aligned on the word boundary in the data memory 4 in step S12 and further the output of the first comparator 261 is a "match" (step S13), the value of the data register 24 is sent to the data bus 62 through the first switch group 23 (step S14). The operation of the first and second switches 23, 22 at this time is shown in FIG. 20, in which only the switches within the ellipse are in the ON position and the others in the OFF position. The ellipse means the same in FIGS. 21 to 27 as well.

Figure 21:
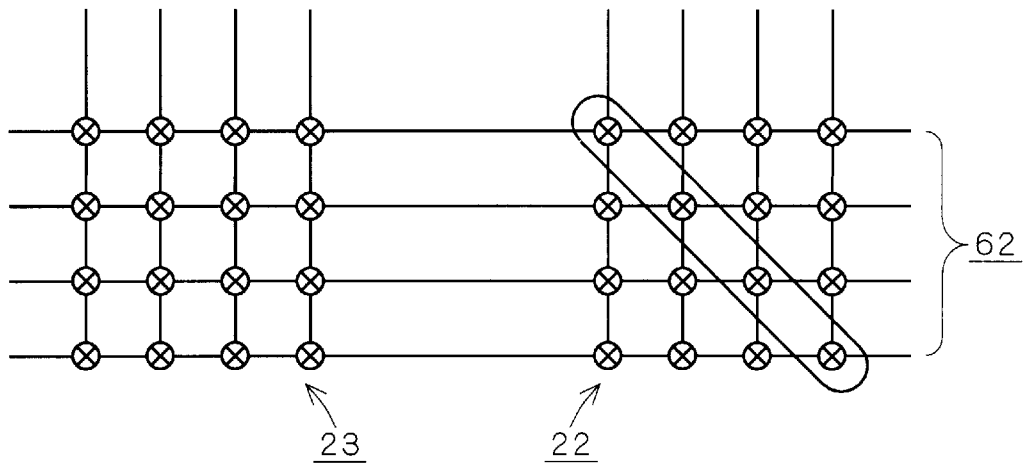
Figure 22:
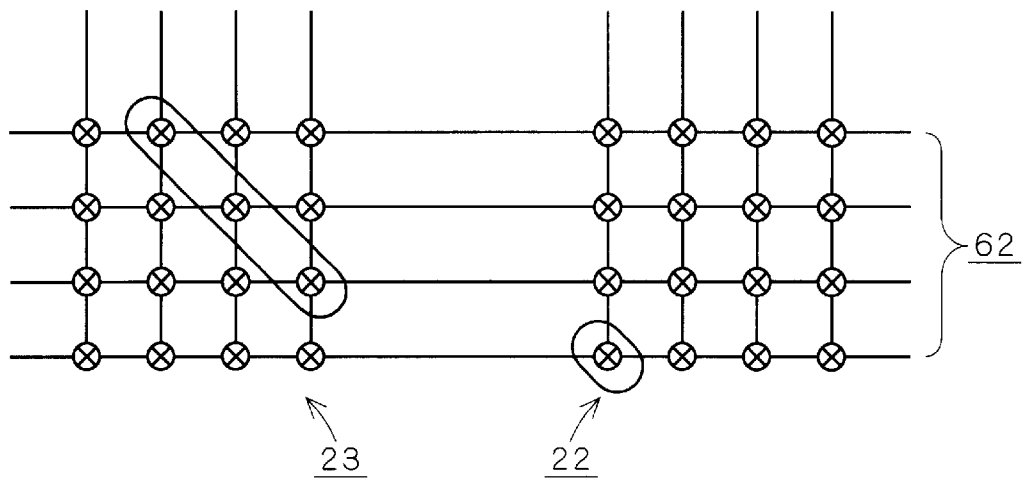
Figure 23:
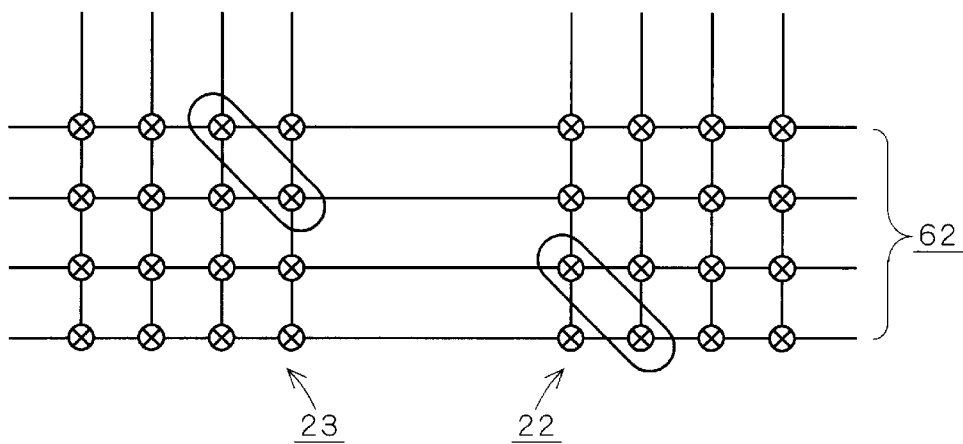
Figure 24:
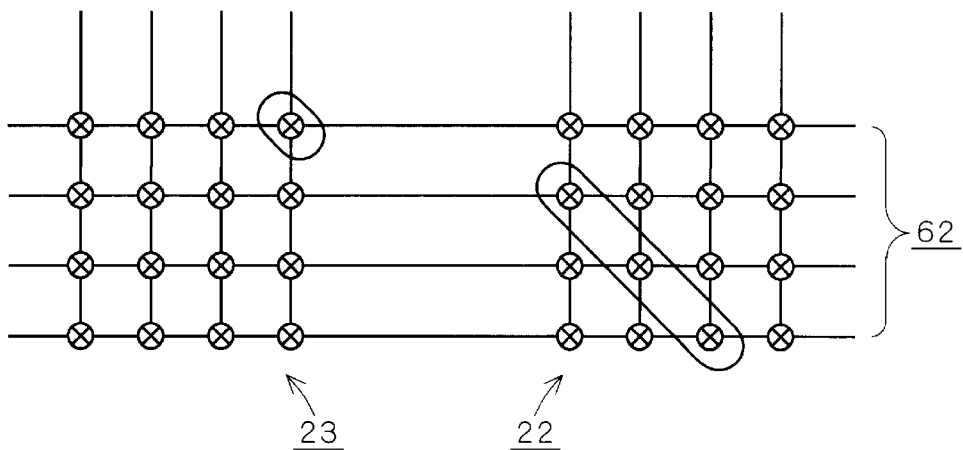
Figure 25:
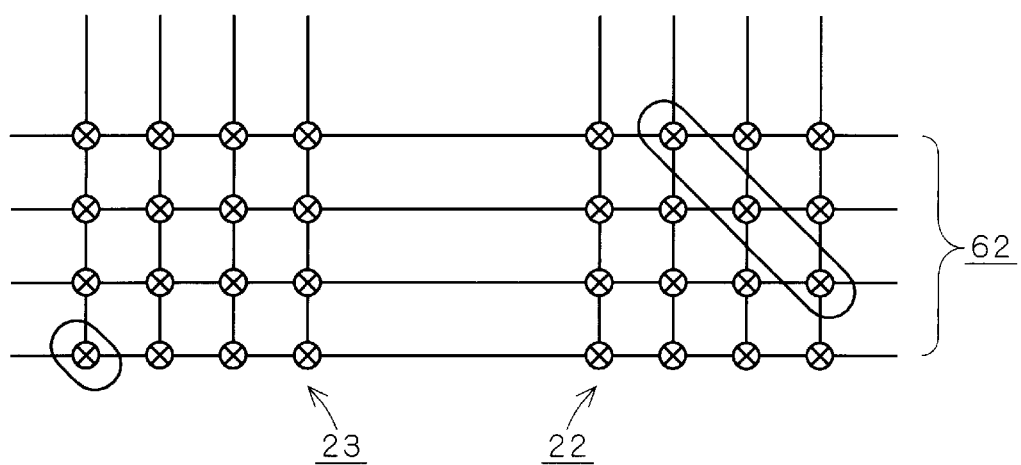
Figure 26:
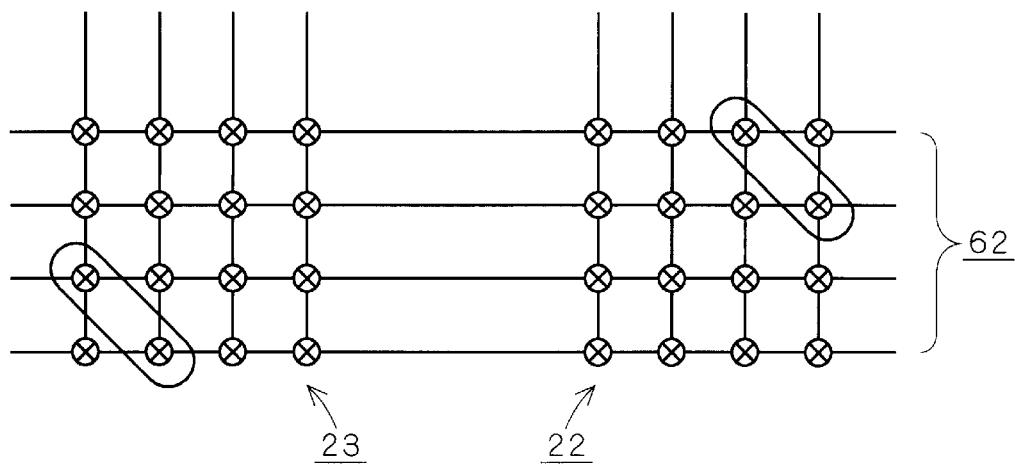

When the output of the first comparator 261 is a "mismatch" (step S13), the higher-order 28 bits MA1 of the operand address OA are outputted as the data memory address MA (step S15) and resultant read data is transferred to the data bus 62 through the second switch group 22 (step S16). The operation of the first and second switch groups 23, 22 at this time is shown in FIG. 21. Further, the value of the data register 24 is updated with the read data from the data memory 4 (step S17). The aforementioned steps can be performed in a single clock cycle.

Now, when the four words specified by the operand address OA are judged as misaligned data not aligned on the word boundary in the data memory 4 in step S12 and further the output of either of the first or second comparators 261, 262 is a "match" (step S18, S20), data held in the data register 24 is outputted through the first switch group 23 and a data memory address MA which addresses data not held in the data register 24 is computed and outputted to the data memory 4 (step S19, S21). Resultant read data from the data memory 4 is fed to the second switch group 22.

The data memory address MA which addresses data not held in the data register 24 corresponds to: (1) the next higher address following the higher-order 28 bits MA1 of the operand address OA when the output of the first comparator 261 is a "match", such an address being obtained by incrementing the higher-order 28 bits MA1 of the operand address OA by 1 (step S19); and (2) the higher-order 28 bits MA1 of the operand address OA itself when the output of the second comparator 262 is a "match" (step S21).

In step S22, the first and second switch groups 23, 22 are selectively turned on according to the lower-order two bits U of the operand address OA to select four consecutive words of data specified by the operand address OA, then the data is transferred on the data bus 62 to the data path unit 3. The aforementioned steps can be performed in a single clock cycle. The operation of the first and second switch groups 23, 22 in step S22 depend on the lower-order two bits U of the operand address OA and the outputs of the first and second comparators 261, 262 as shown in FIGS. 22 to 27.

When neither the first nor second comparators 261, 262 indicates a "match" (steps S18, S20), data output to the data path unit 3 requires two cycles. In the first cycle, the higher-order 28 bits MA1 of the operand address OA are outputted (step S23) and resultant read data is loaded into the data register 24 (step S25). At this time, all the switches in the first and second switch groups 23, 22 are turned off (step S24), so no data is outputted to the data path unit 3. Concurrently with this, a wait signal (not shown) for the control unit 1 is generated and one cycle of wait is inserted in the pipeline.

In the second cycle, since the first comparator 261 always indicates a "match", the value obtained by incrementing the higher-order 28 bits MA1 of the operand address OA is outputted as the data memory address MA (step S26). Then, the first switch group 23 selects necessary data from the four words in the data register 24 and the second switch group 22 selects necessary data from the 4-word read data, thereby sending four consecutive words of data specified by the operand address OA to the data path unit 3 (step S27). The operation of the first and second switch groups 23, 22 in step S27 is shown in FIGS. 22 to 27.

Now, we will describe the case where operand data access according to the store instruction starts (step S3). The buffer controller 26 disables the first tri-state buffer 20 and enables the second tri-state buffer 21 (step S31). Since the data processor of this preferred embodiment does not support data store to operand addresses OA specifying misaligned data in the data memories 4, 5, the lower-order two bits U of the operand address OA in a word address format are ignored and the higher-order 28 bits MA1 are outputted as the data memory address MA to the data memory 4 (step S32). During the store operation (step S3), for the purpose of maintaining coherency between the data memory 4 and the data register 24, the valid/invalid bit V of the address register 25 is made invalid to disable the value of the data register 24 (step S33).

The coherency between the data memory 4 and the data register 24 refers to the fact that 4-word data in the data memory 4 corresponding to the data memory address MA held in the address register 25 matches 4-word data held in the data register 24. In other words, maintaining the coherency is equivalent to maintaining a set of address and data in the data register 24 and in the address register 25 to always reflect a set of address and data in the data memory 4.

Since the data register 24 is disabled in the store operation (step S3), even if data in the data memory 4 is rewritten, the values of the address register 25 and the data register 24 will always be updated (step S17, S25) at the restart of the load operation (step S2). This prevents the possibility that the value of the data register 24 which does not reflect rewritten data in the data memory 4 is referred to by mistake.

As described so far, except in cases where misaligned data is specified as operand data and thus neither of the first and second comparators 261, 262 indicates a "match" (FIG. 18), a load of 4-word data from the data memory 4 to the data path unit 3 can be accomplished in a single cycle irrespective of whether operand data in the load instruction is aligned on the word boundary. At the time of consecutive execution of load instructions, as long as the postincrement (or postdecrement) size is one word, the above exceptional case would not occur except in the first execution of the load instructions. Accordingly, except in the first execution, the load instruction loading misaligned data as operand data can be executed in every one cycle.

1–5. Advantages of First Preferred Embodiment

The data processor of the first preferred embodiment can concurrently perform processing such as product-sum operations in the data path unit 3, updating of the address pointers in the operand-address generation units 8, 9, and operand data access to the two data memories 4, 5 through the alignment buffers 6, 7. It also makes it possible to load operand data from the data memories 4, 5 in a single cycle. Accordingly, product-sum operations can be accomplished with a throughput of a single cycle.

Figure 28:
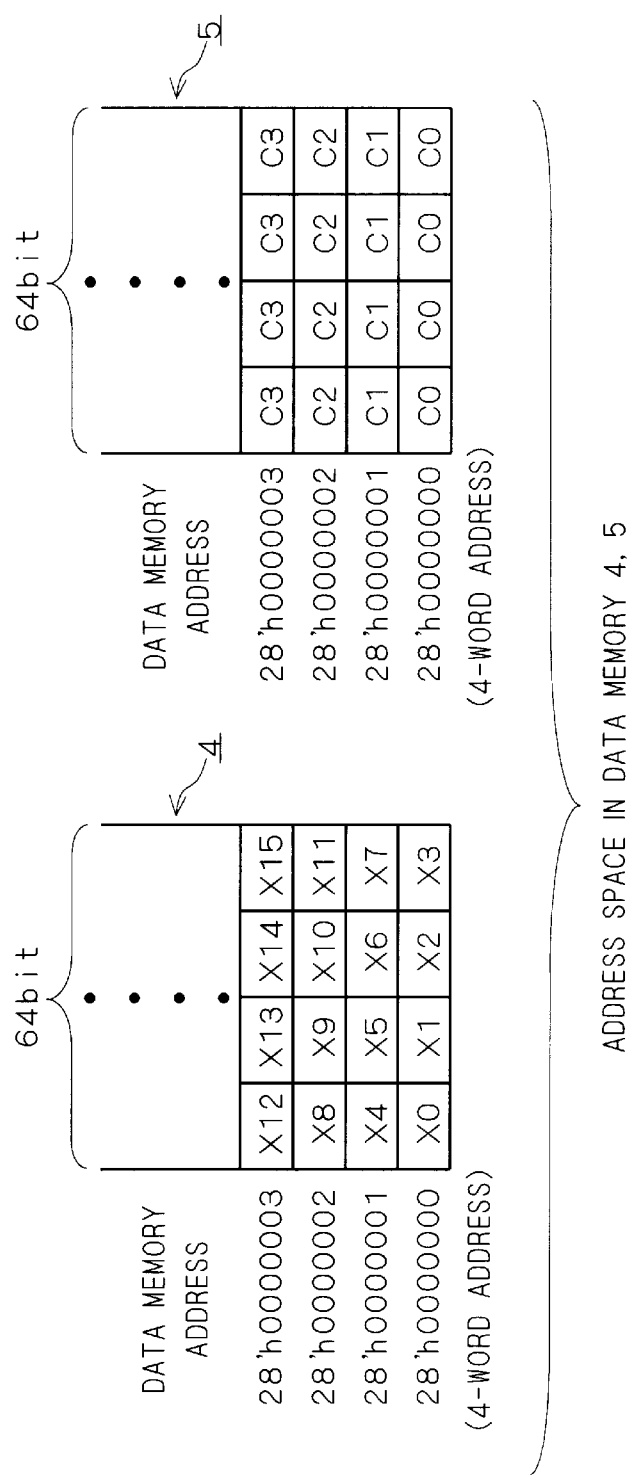
FIG. 28 is an explanatory diagram of data in data memory of the first preferred embodiment.

Now, consider the case where the data processor of this preferred embodiment achieves FIR processing. It is assumed that the two data memories 4, 5 store data X and coefficients C, respectively, as shown in FIG. 28. To speed up an arithmetic or logic operation by processing in parallel four 16- by 16-bit product-sum operations as shown in FIG. 67, it is necessary to perform product-sum operations holding eight data in the dotted box of FIG. 67 as operand data in every cycle. In this case, four words must be loaded from each of the data memories 4, 5 in every cycle. Although three out of four operand data from the data memory 4 are misaligned data, the increment (or decrement) size of one word allows necessary data to be loaded in a single cycle. This makes it possible to perform product-sum operations with a throughput of a single cycle.

In this fashion, the data processor of this preferred embodiment can achieve consecutive execution of load instructions holding misaligned data as operand data with a throughput of a single cycle, thereby improving processing speed. Further, there is no need to consider data alignment/misalignment in program development, which improves program development efficiency.

2. Second Preferred Embodiment

A data processor of a second preferred embodiment differs from that of the first preferred embodiment in its characteristic that, in the store operation, the value of the data register 24 is updated with write data when the data memory address MA matches the value of the address register 25. This permits maintenance of coherency without disabling the data register 24. Therefore, a load of operand data can be accomplished in a single cycle from the beginning of the restart of the load operation.

FIG. 29 is a flowchart of the procedure of the store operation (step S3) performed by the buffer controller 26 in the data processor of the second preferred embodiment. When the store operation starts, the address held in the address register 25 is compared with the data memory address MA specifying write data (step S41). When the comparison result shows a match of the values, the buffer controller 26 enables not only the first tri-state buffer 20 but also the second tri-state buffer 21 (step S42) and writes data to be written into the data memory 4, into the data register 24 (step S43). When the values mismatch, only writing to the data memory 4 is performed without updating the value of the data register 24 (steps S44, 43). This store operation can be performed in a single cycle.

In the data processor of the first preferred embodiment, the data register 24 is disabled when consecutive execution of load instructions holding misaligned data as operand data is interrupted to execute the store instruction. Thus, in order to restart the load instruction, which has been executed immediately before the start of the store instruction, after the execution of the store instruction is complete, the first operation requires two cycles.

On the other hand, the data processor of the second preferred embodiment updates the value of the data register 24 at the same time as data stored in the data memory 4 at the same address as the value of the address register 25 is updated. This permits maintenance of coherency between the data memory 4 and the data register 24 without disabling the data register 24. Since the data register 24 is not disabled, a load of operand data can be accomplished in a single cycle from the beginning of the restart of the load operation. In this fashion, the store operation does not decrease the efficiency of the load operation. Further, the absence of the necessity to disable the data register 24 avoids the necessity for the valid/invalid bit V of the address register 25; therefore, the address register can only be 28 bits in length.

3. Third Preferred Embodiment

A data processor of a third preferred embodiment comprises alignment buffers, each having two registers to hold data stored at two addresses in the data memory, between the data memory and the data path unit. The alignment buffers output word-aligned/misaligned data to the data path unit by selecting operand data from among data held in the two registers, or from among data held in either of the registers and read data from the data memory, or from among read data from the data memory. As long as the difference between operand addresses (width of update) for consecutive read operations is within plus or minus four on a data-memory-address basis, either of word-aligned or misaligned data can be obtained through a maximum of one access to the data memory. Thus, consecutive read operations (load operations) handling misaligned data as operand data can be accomplished with a throughput of a single cycle.

3–1. Configuration of Data Processor

Figure 30:
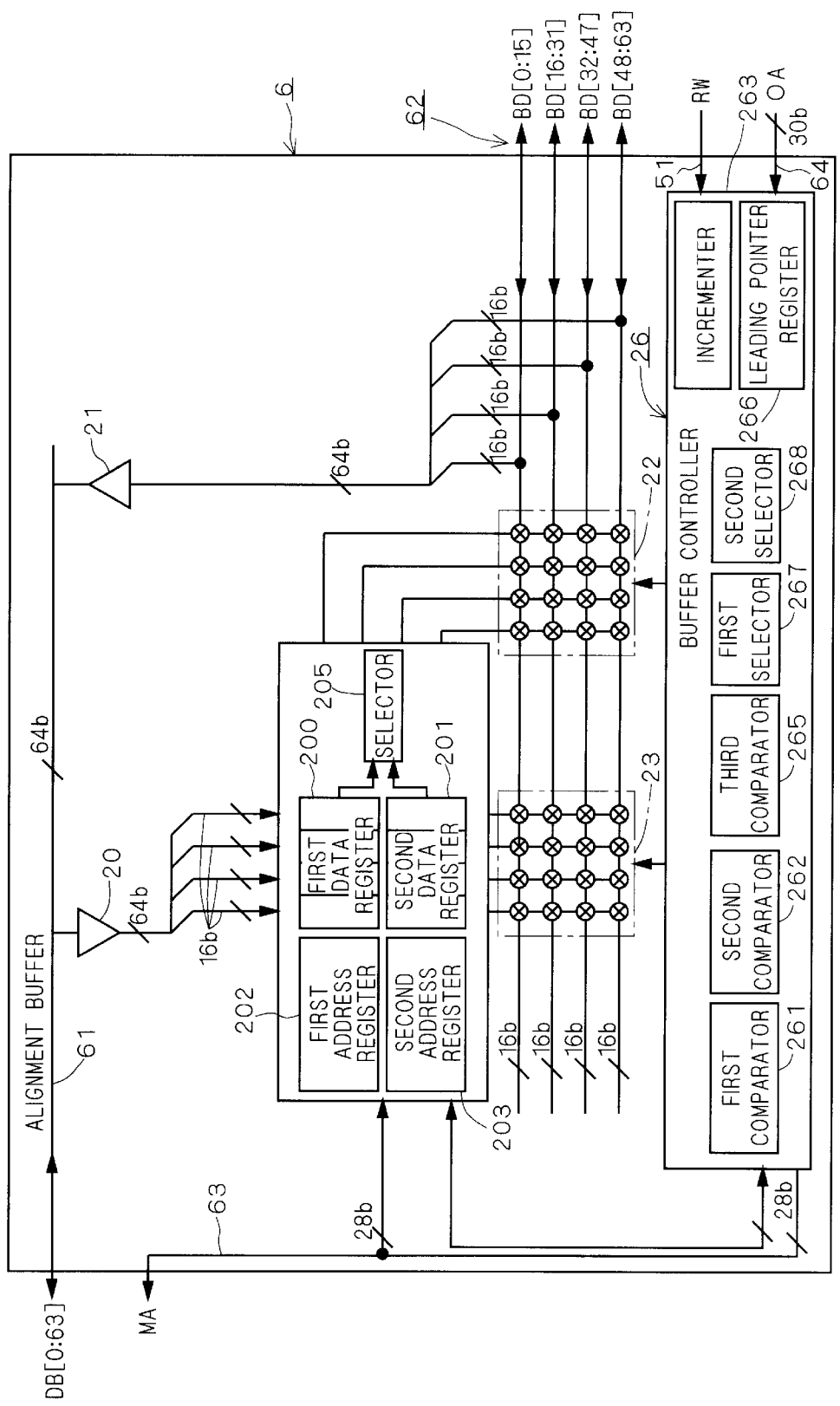
FIG. 30 is a block diagram of an alignment buffer of a third preferred embodiment.

The data processor of the third preferred embodiment is identical to that in FIG. 1. FIG. 30 is a block diagram of a configuration of the alignment buffer 6 according to the third preferred embodiment. This alignment buffer 6 differs from that of the first preferred embodiment (FIG. 1) in its characteristic that it further comprises first and second address registers 202, 203, first and second data registers 200, 201, a selector 205, a third comparator 265, a leading pointer register 266, a first selector 267, and a second selector 268.

The output of the first tri-state buffer 20 is connected in common to the first and second data registers 200, 201 and the second switch group 22. The outputs of the data registers 200, 201 are connected to the first switch group 23 through the selector 205. These registers 202, 203, 200, 201 and the selector 205 are also controlled by the buffer controller 26.

The buffer controller 26 comprises the first comparator 261, the second comparator 262, the third comparator 265, the incrementer 263, the leading pointer register 266, the first selector 267, and the second selector 268. The value of the leading pointer register 266 indicates which of the two data registers 200 and 201 holds data with the lowest address out of a maximum of eight consecutive words of data.

Figure 31:
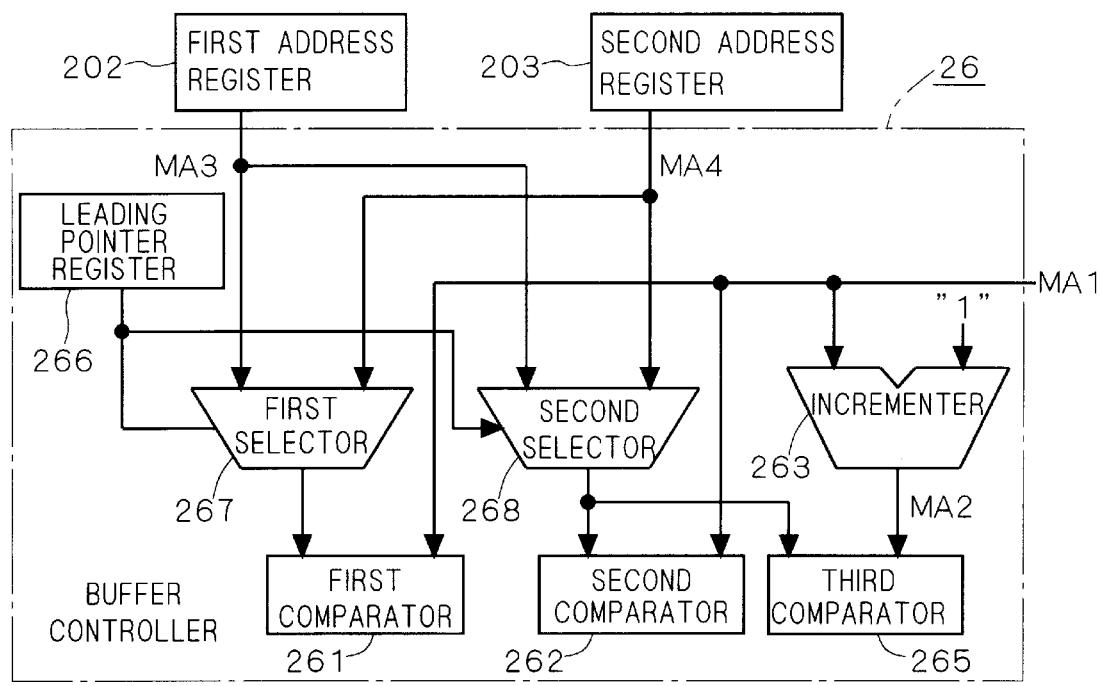
FIG. 31 is an explanatory diagram of the operation of a buffer controller of the third preferred embodiment.
Figure 32:
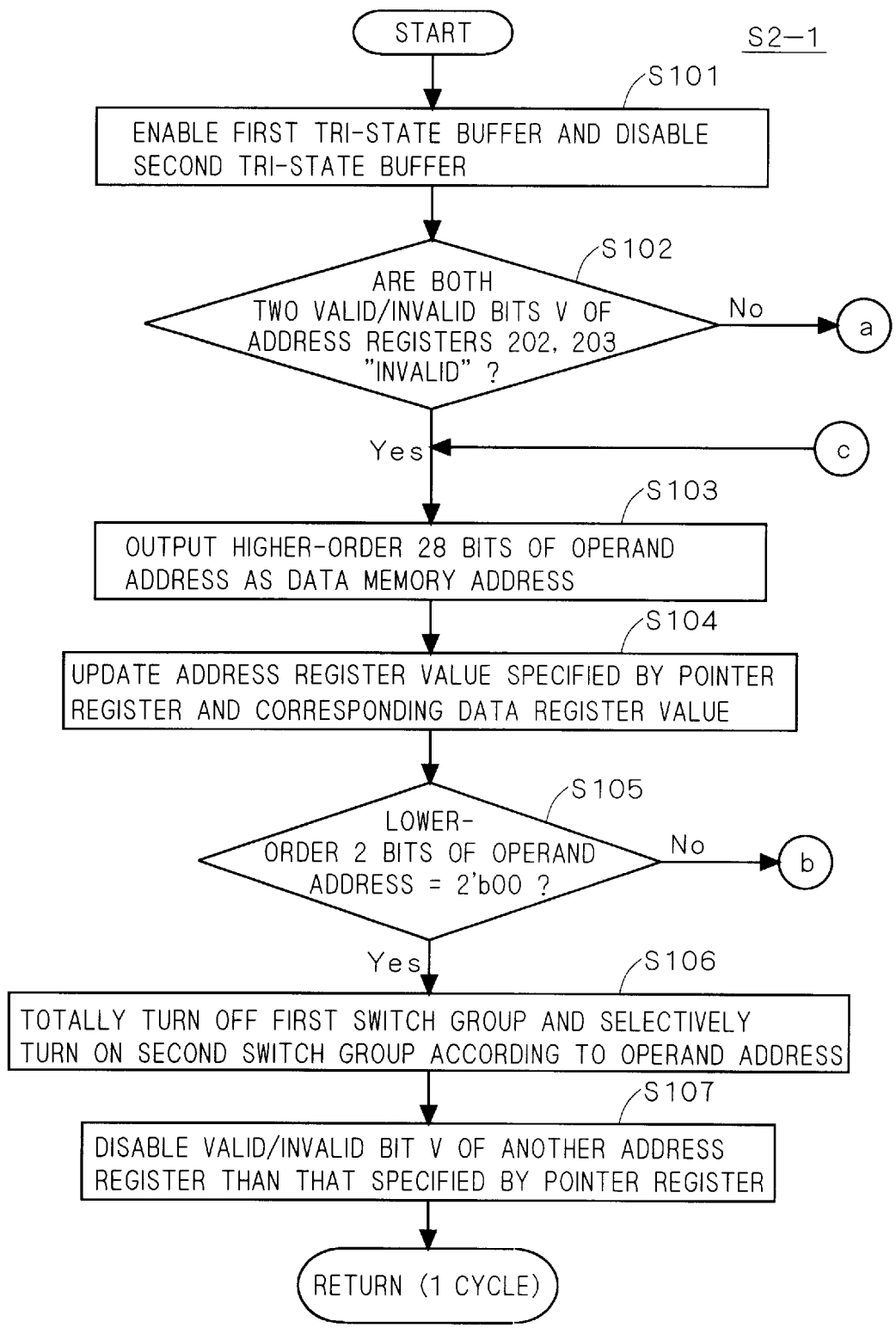
FIGS. 32 to 40 are flowcharts of the procedure of the buffer controller of the third preferred embodiment.
Figure 33:
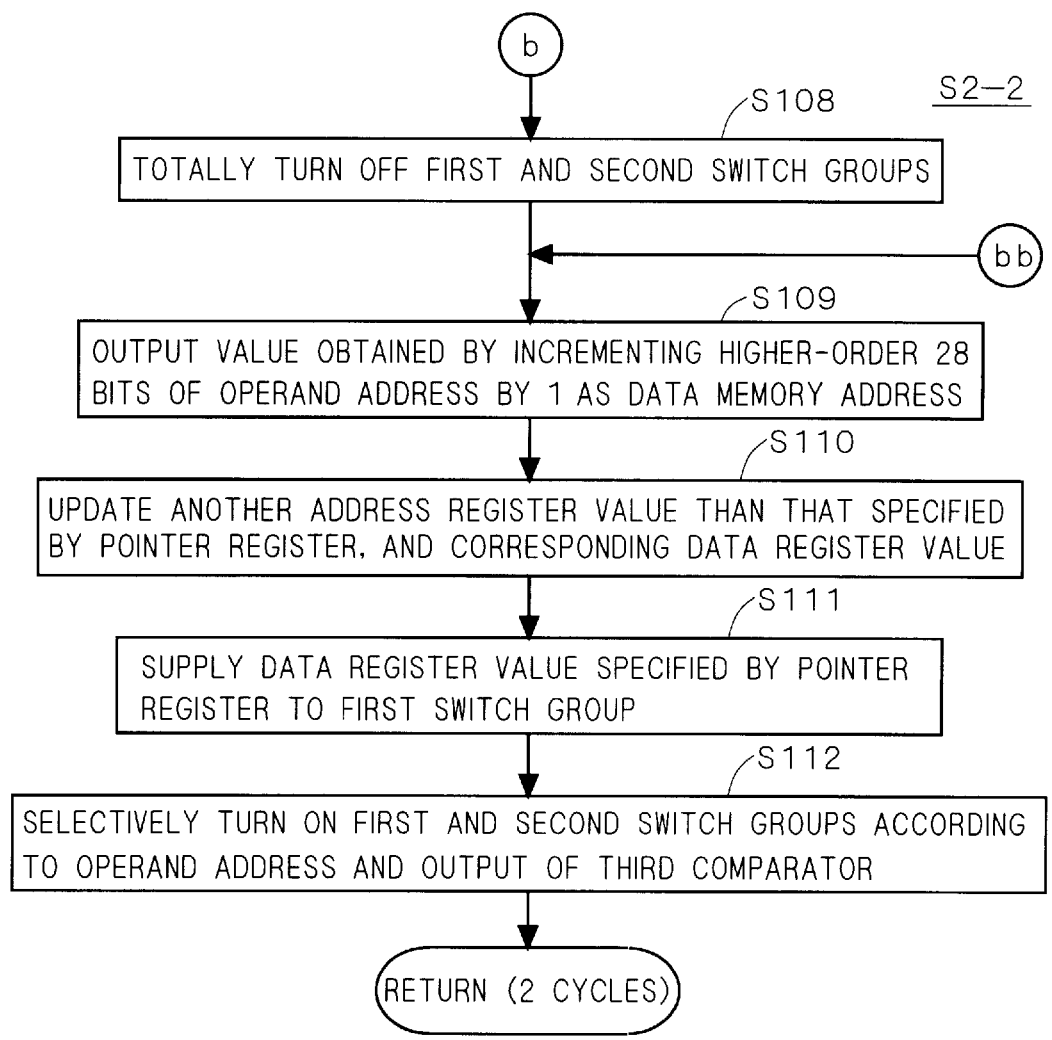
Figure 34:
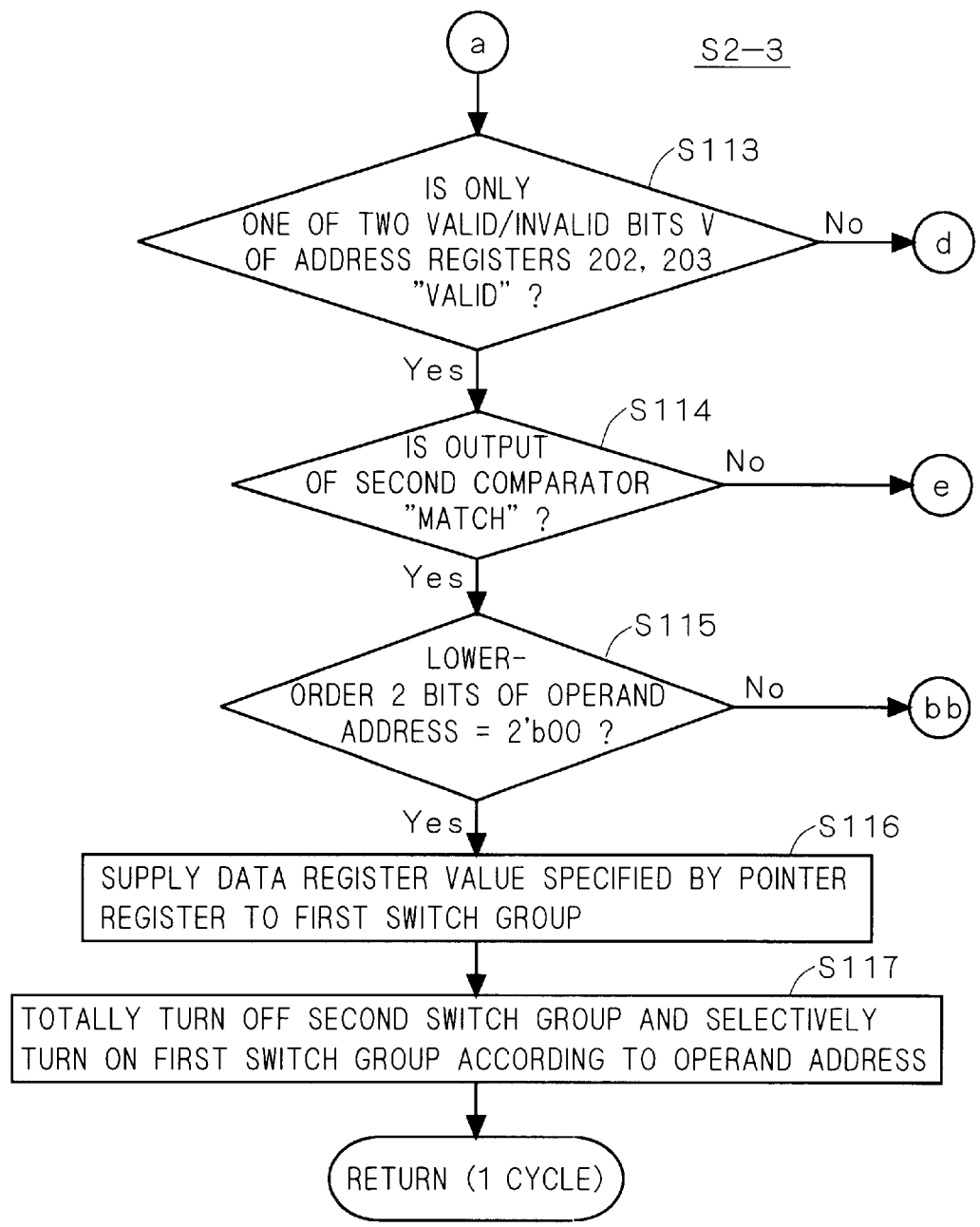
Figure 35:
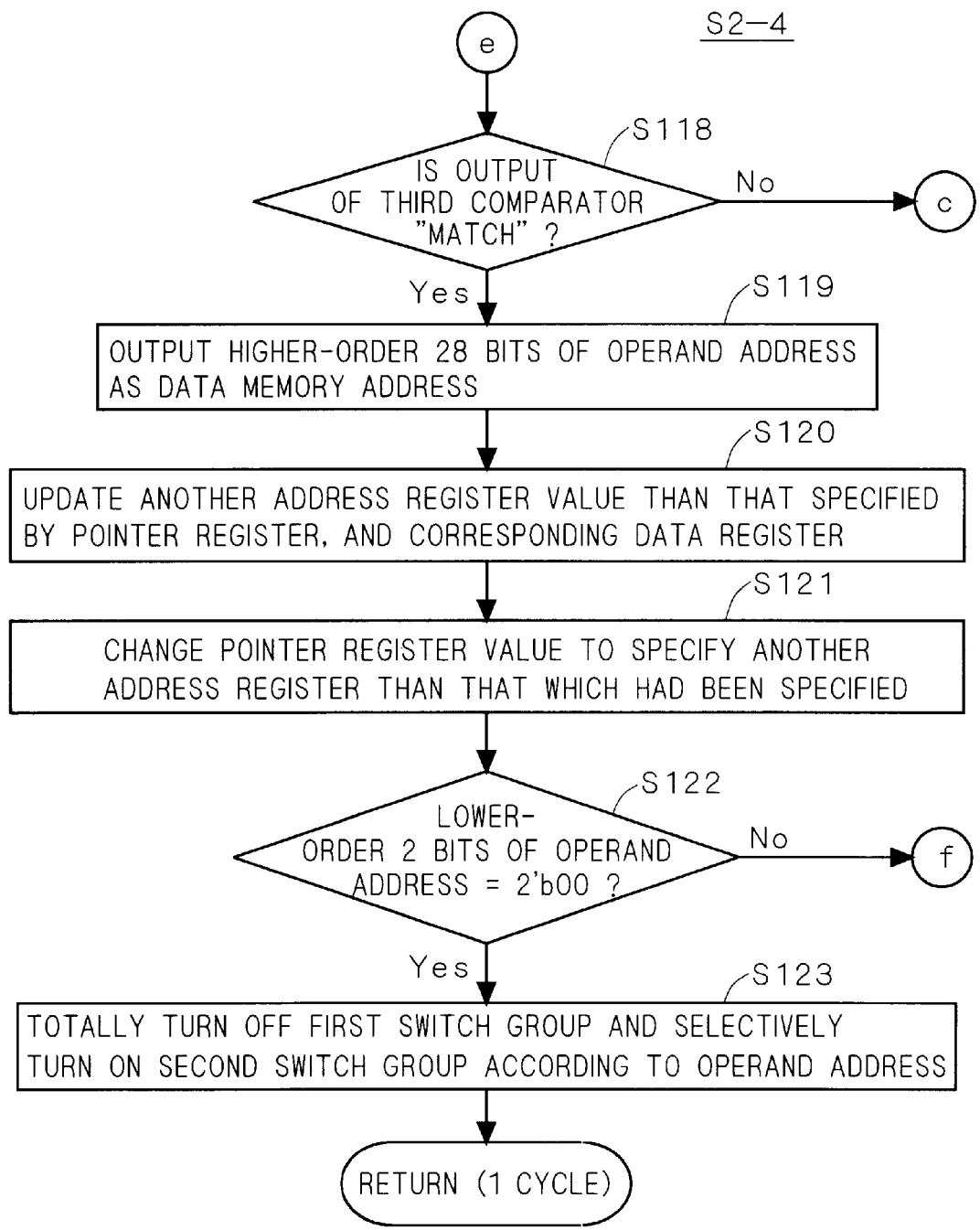
Figure 36:
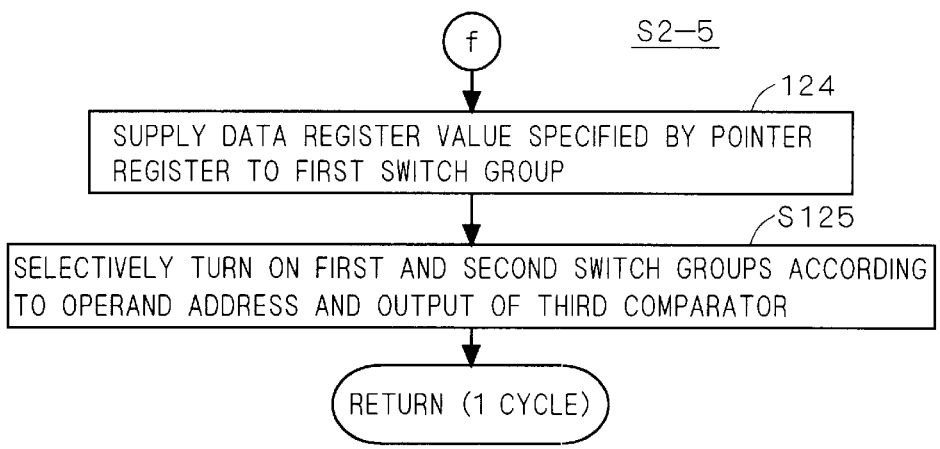
Figure 37:
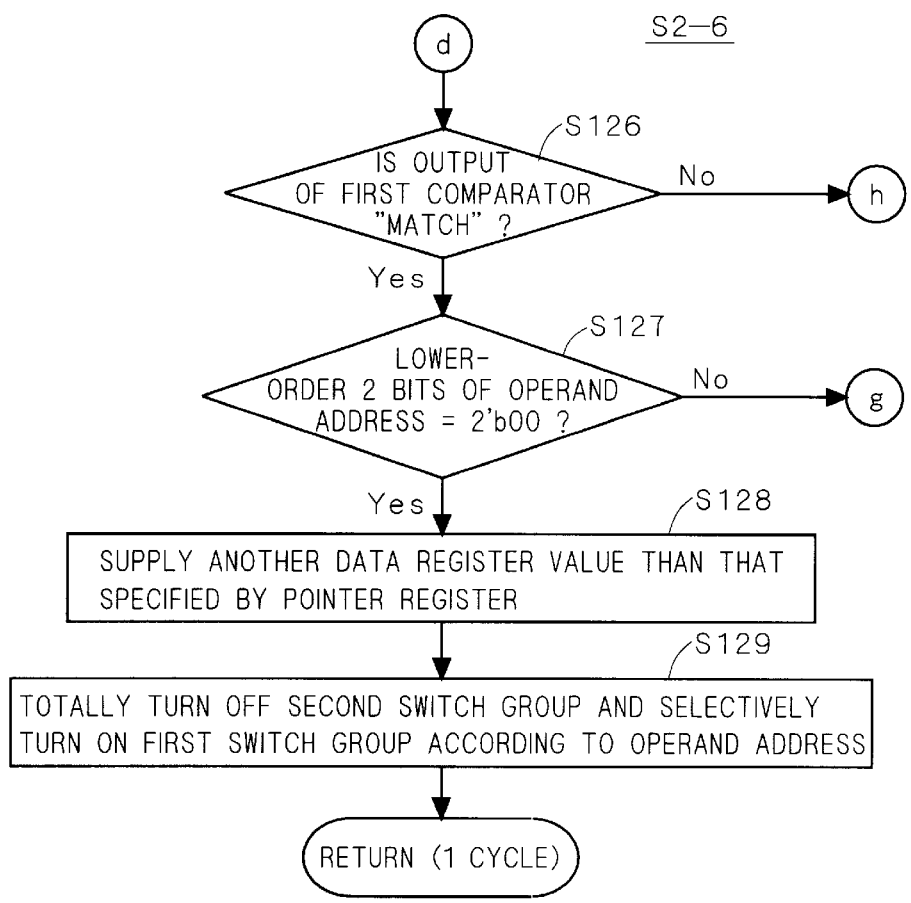
Figure 38:
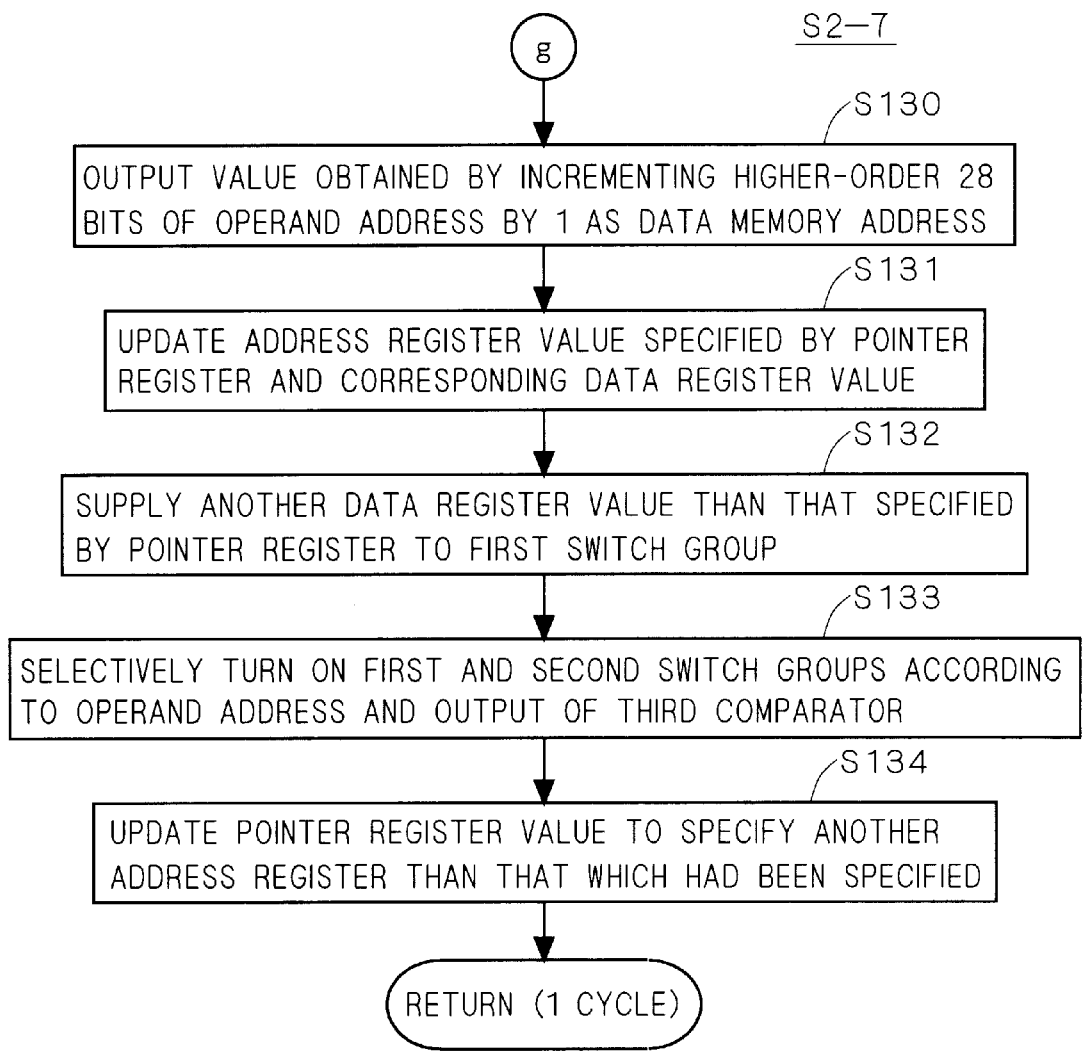
Figure 39:
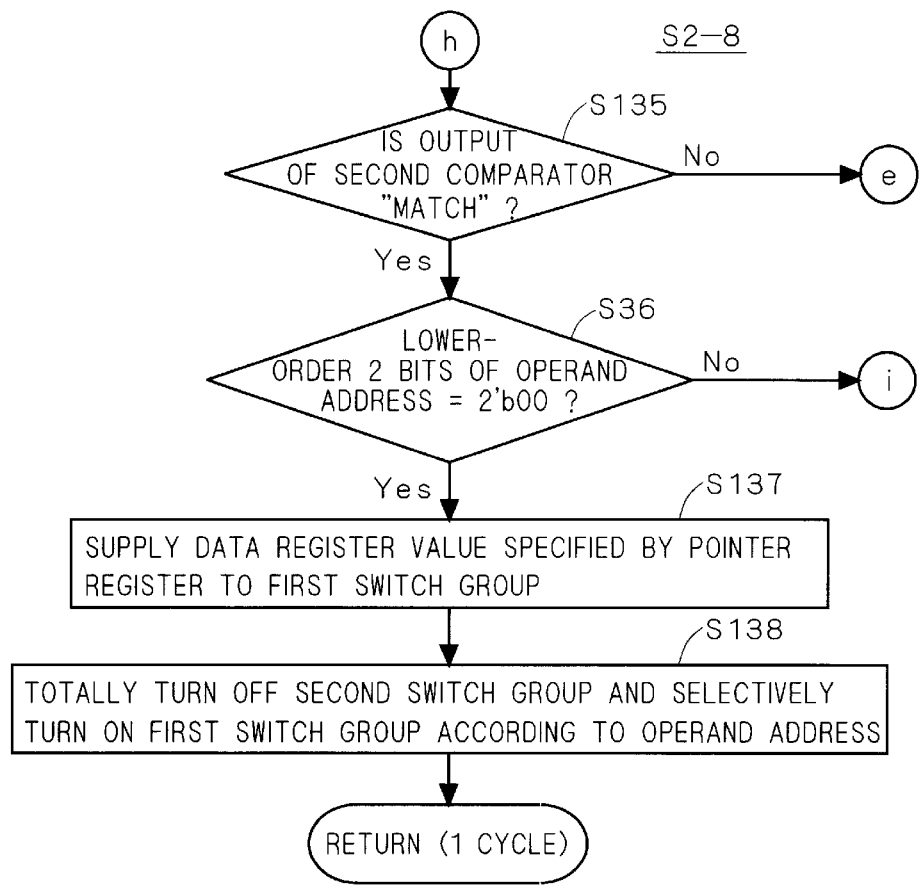
Figure 40:
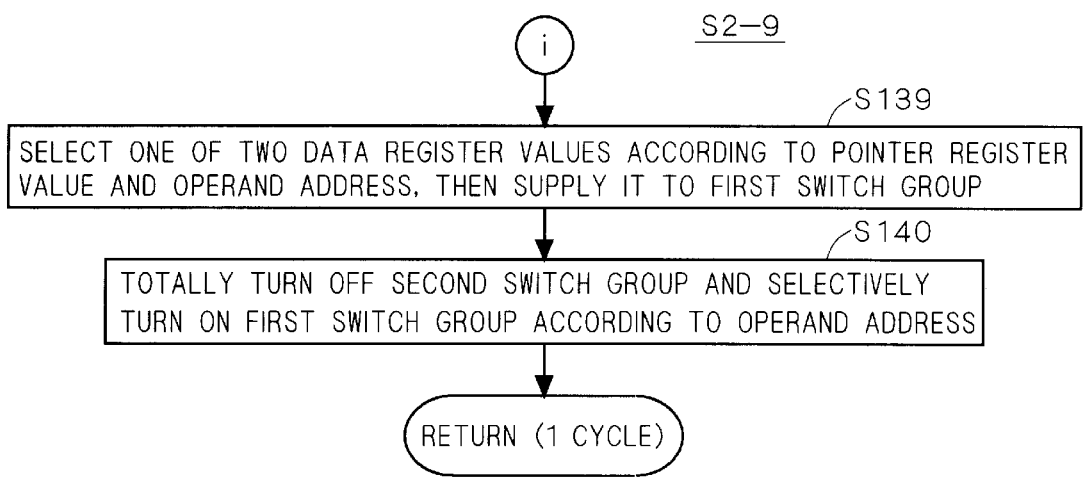

The first selector 267 shown in FIG. 31 selects the higher of lower-order 28 bits MA3 of the first address register 202 and lower-order 28 bits MA4 of the second address register 203. The second selector 268 selects the lower of the lower-order 28 bits MA3 of the first address register 202 and the lower-order 28 bits MA4 of the second address register 203. Which of the first and second address registers 202, 203 holds the higher address is determined by the value of the leading pointer register 266.

The first comparator 261 makes a comparison between the output of the first selector 267 and the higher-order 28 bits MA1 of the operand address OA, and the second comparator 262 makes a comparison between the output of the second selector 268 and the higher-order 28 bits MA1 of the operand address OA by 1. The third comparator 265 makes a comparison between the output of the second selector 268 and a value MA2 obtained by incrementing the higher-order 28 bits MA1 of the operand address OA by 1. When receiving the valid/invalid bit V indicating an "invalid" which enters with the value MA3, MA4 by the selection of the selector 267, 268, the output of each comparator 261, 262, 265 becomes a "mismatch" irrespective of the address value.

In the third preferred embodiment, the two data registers 200, 201 are controlled to always hold the values at contiguous data memory addresses. But, this is not the case where either or both of the address registers have the most significant bits or valid/invalid bits V indicating an "invalid".

When the output of the first comparator 261 is a "match", the data register with the highest address out of the consecutive data holds data stored at the head address. At this time, if operand data is misaligned data, data stored at the end address is not held in the data registers. Thus, the value MA2 obtained by incrementing the higher-order 28 bits MA1 of the operand address OA by 1 is outputted as the data memory address MA to the data memory 4, and from among resultant read data and data with the head address held in the register, operand data is selected and outputted to the data path unit 3.

When the output of the second comparator 262 is a "match", the data register with the lowest address holds data stored at the head address. That is, when both of the two data registers 200, 201 hold valid data, all operand data is held in those registers 200, 201. Thus, operand data is selected from among data stored at the head address and data stored at the end address which are held in the two data registers 200, 201, and outputted to the data path unit 3.

When either of the registers holds invalid data and operand data is not word-aligned data, data stored at the end address is not held in the data registers. Thus, the value MA2 obtained by incrementing the higher-order 28 bits MA1 of the operand address OA by 1 is outputted as the data memory address MA to the data memory 4, and from among resultant read data and data with the head address held in the register, operand data is selected and outputted to the data path unit 3.

When the output of the third comparator 265 is a "match" and operand data is misaligned data, the data register with the lowest address holds data stored at the end address. When operand data is word-aligned data, this register holds data stored at the end address plus one and thus operand data is contiguous to the data held in the register. In either case, data stored at the head address is not held in the registers, so the higher-order 28 bits MA1 of the operand address OA are outputted as the data memory address MA to the data memory 4. When operand data is word-aligned data, resultant read data is sent to the data path unit 3. When operand data is misaligned data, the operand data is selected from among the read data and data stored at the end address which is held in the register, and outputted to the data path unit 3.

When all the outputs of the first, second, and third comparators 261, 262, 265 are a "mismatch", neither of data stored at the head address and data stored at the end address is held in the registers. Thus, when operand data is word-aligned data, the higher-order 28 bits MA1 of the operand address OA are outputted as the data memory address MA to the data memory 4 and resultant read data is outputted to the data path unit 3.

When operand data is misaligned data, the higher-order 28 bits MA1 of the operand address OA are outputted as the data memory address MA to the data memory 4 and resultant read data is stored in one of the data registers. In the subsequent cycle, the value MA2 obtained by incrementing the higher-order 28 bits MA1 of the operand address OA by 1 is outputted to the data memory 4, and from among resultant read data and data stored at the head address which is held in the register, operand data is selected and outputted to the data path unit 3.

3–2. Operations of Buffer Controller

The control procedure by the buffer controller 26 is illustrated in FIG. 14. FIGS. 32 to 40 show a flow of the load operation (step S2) according to the third preferred embodiment. When the load operation starts, the buffer controller 26 enables the first tri-state buffer 20 and disables the second tri-state buffer 21 (step S101).

Figure 41:
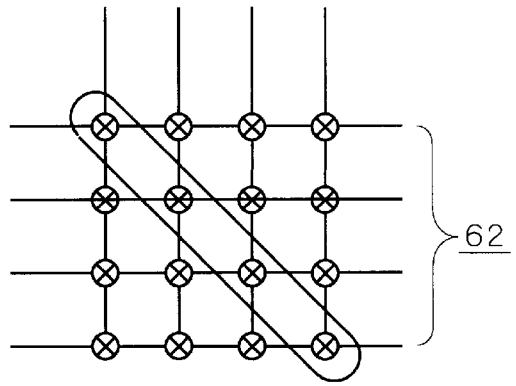
FIGS. 41 to 47 are explanatory diagrams of the operations of a data selector of the third preferred embodiment.

In step S102, it is determined whether both the two valid/invalid bits V of the address registers 202, 203 indicate an "invalid". A positive judgment result (Yes) in this step indicates that the two data registers 200, 201 do not hold valid data after initialization of the data processor or after disabled for the execution of the store operation. That is, neither of data stored at the head address and data stored at the end address is held in those registers. Thus, data stored at the head address is read out (step S103) and the values of the address register specified by the pointer register 266 and the corresponding data register are updated with the read address and the read data (step S104). In this case, this update data will not take effect until the next cycle. When data to be read is word-aligned data (step S105), the first switch group 23 is turned off and the second switch group 22 is selectively turned on according to the operand address OA, whereby the read data from the data memory 4 is sent to the data path unit 3 (step S106). Then, another data register than that which was updated in step S104 is disabled (step S107). The operation of the second switch group 22 in step S106 is illustrated in FIG. 41. The processing from steps S101 to S107 can be performed in a single cycle.

Figure 42:
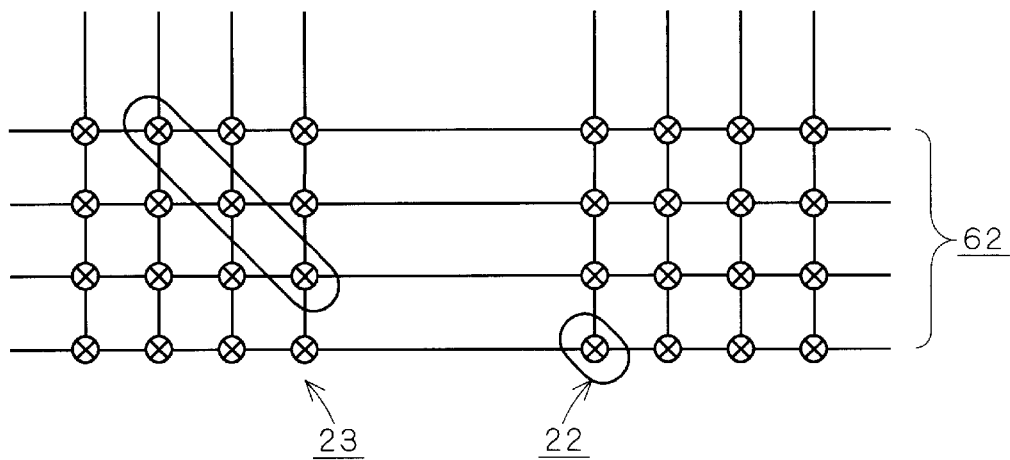
Figure 43:
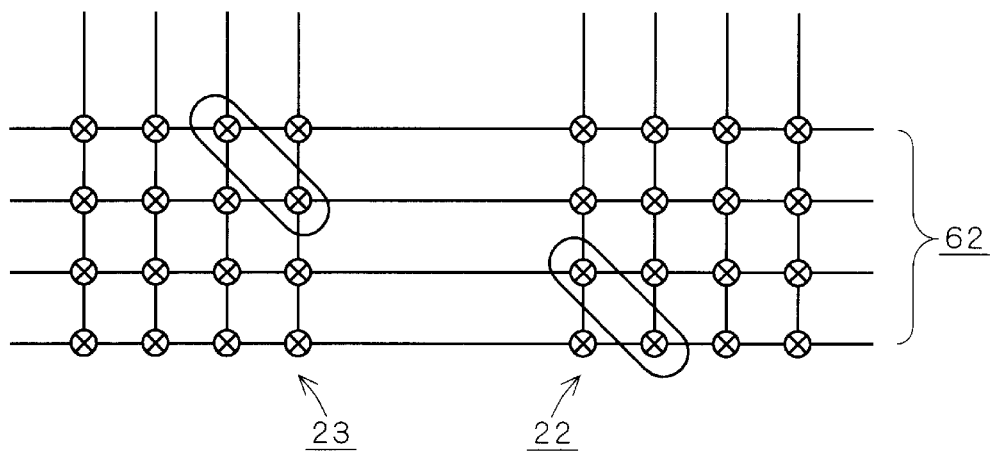
Figure 44:
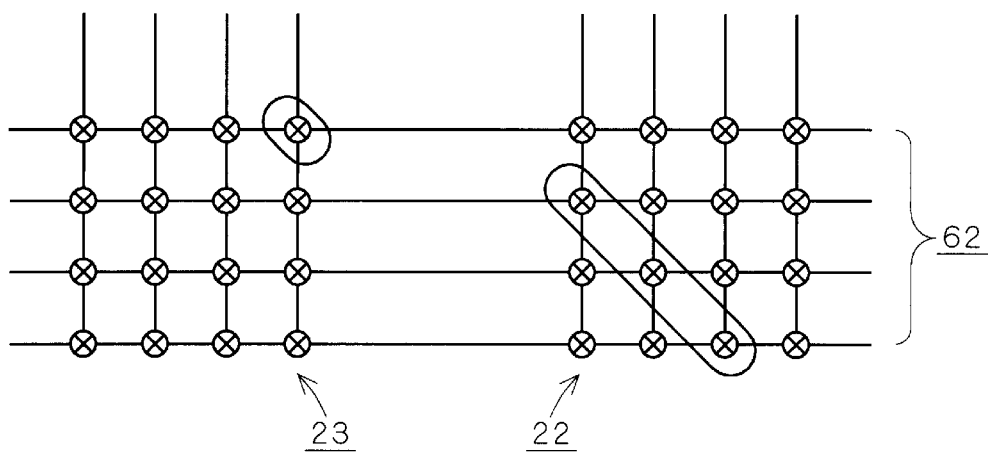

When data to be read out is misaligned data (step S105), the first and second switch groups are completely turned off (step S108) and a wait signal (not shown) for the control unit 11 is generated to insert one cycle of wait in the pipeline. In the next cycle, a value obtained by incrementing upper 28 bits of the operand address OA by one is output as a data memory address to read out data stored at the end address from the data memory 4 (step S109). And, another address register than that specified by the pointer register 266, and the corresponding data register are updated with the end address and the read data, respectively (step S110). Then, the value of the data register specified by the pointer register 266 and holding data stored at the head address is supplied to the first switch group 23 (step S111) and the first and second switch groups 23, 22 are selectively turned on according to the operand address OA and the output of the third comparator 265 to send misaligned data to the data path unit 3 (step S112). The processing from steps S101 to S112 is performed in two cycles. The operation of the first and second switch groups 23, 22 in step S112 is illustrated in FIGS. 42 to 44.

When the judgment result in step S102 is negative (No), then whether only one of the two valid/invalid bits V of the address registers 202, 203 indicates a "valid" is determined (step S113). When this judgment result is positive, then whether the value of the address register holding valid data is equal to the head address and whether the same is equal to the end address are determined. The second comparator 262 is used for the former judgment (step S114) and the third comparator 265 for the latter (step S118).

When the result in step S114 is positive, the data register holds data stored at the head address. When operand data is word-aligned data (step S115), this data register holds all 4-word data specified by the operand address OA since the head address and the end address are equal. Thus, the value of the data register specified by the leading pointer register 266 is selected and transferred to the first switch group 23 (step S116). Further, the second switch group 22 is totally turned off and the first switch group 23 is selectively turned on according to the operand address OA, whereby word-aligned data is sent to the data path unit 3 (step S117). The operation of the first switch group 23 in step S117 is illustrated in FIG. 41. The processing from steps S101 to S117 can be performed in a single cycle.

When operand data is misaligned data in step S115, the data register holds data stored at the head address, but data stored at the end address is not held. Thus, the steps S109 to S112 described before are performed after step S115. The processing from steps S101 to S112 can be performed in a single cycle. The operation of the first and second switch groups 23, 22 in step S112 is illustrated in FIGS. 42 to 44.

When the output of the second comparator 262 is a "mismatch" (step S114), then whether the output of the third comparator 265 is a "match" is determined in step S118. When the output of the third comparator 265 is a "match" (step S118) and the operand address OA specifies misaligned data, the data register holds data stored at the end address; when the operand address OA specifies word-aligned data, the data register holds data stored at the data memory address obtained by incrementing the end address by 1. In either case, data stored at the head address is not held in the data register. Thus, upper 28 bits of the operand address OA is output as a data memory address to read out data stored at the head address from the data memory 4 (step S119) and another address register than that specified by the pointer register and the corresponding data register are updated with the head address and the read data, respectively (step S120). At this time, another data register than that which has held data with the lowest address is updated with data stored at the lower address; therefore, the value of the leading pointer register 266 is updated to indicate another data register than that which had been indicated (step S121).

Then, when the operand address OA specifies word-aligned data (step S122), none of 4-word data specified by the operand address OA is held in the data register since the head address and the end address are equal. Thus, the first switch group 23 is totally turned off and the second switch group 22 is selectively turned on according to the operand address OA, whereby the data stored at the head address which was read out from the data memory 4 in step S119 is sent to the data path unit 3 (step S123). The operation of the second switch group 22 in step S123 is illustrated in FIG. 41. The processing from steps S101 to S123 can be performed in a single cycle.

Figure 45:
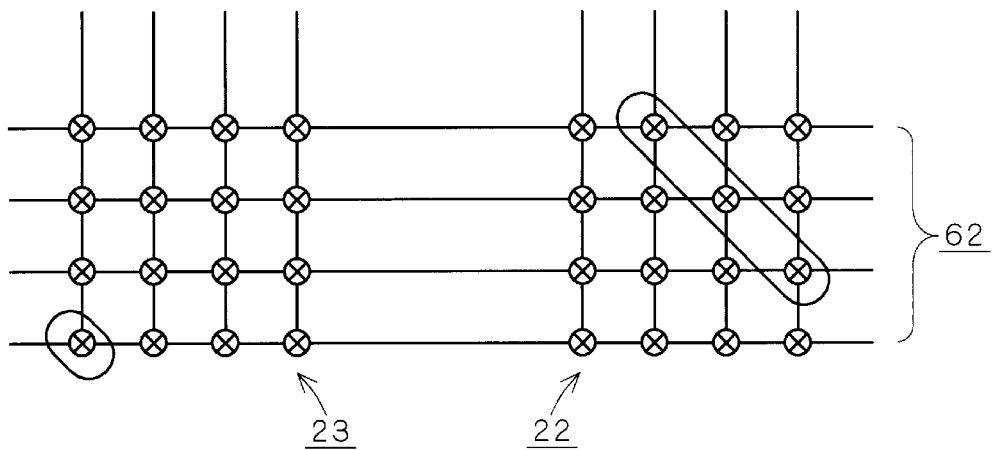
Figure 46:
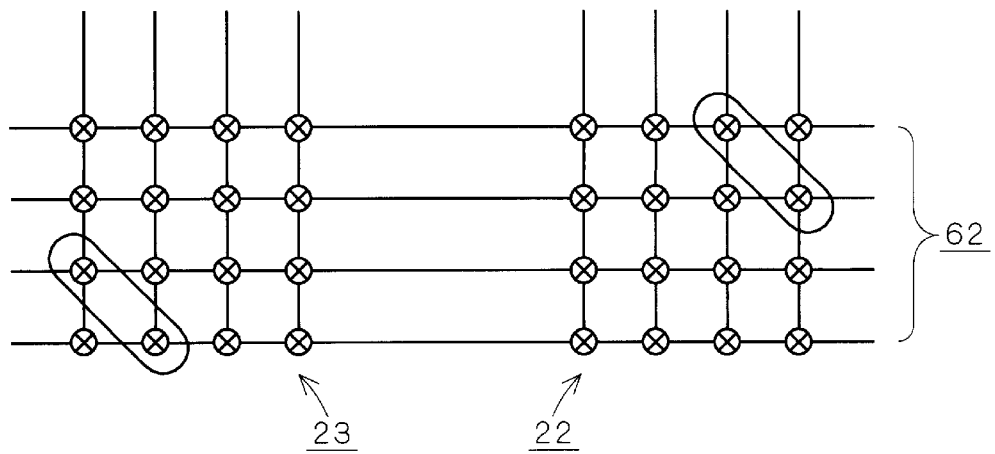
Figure 47:
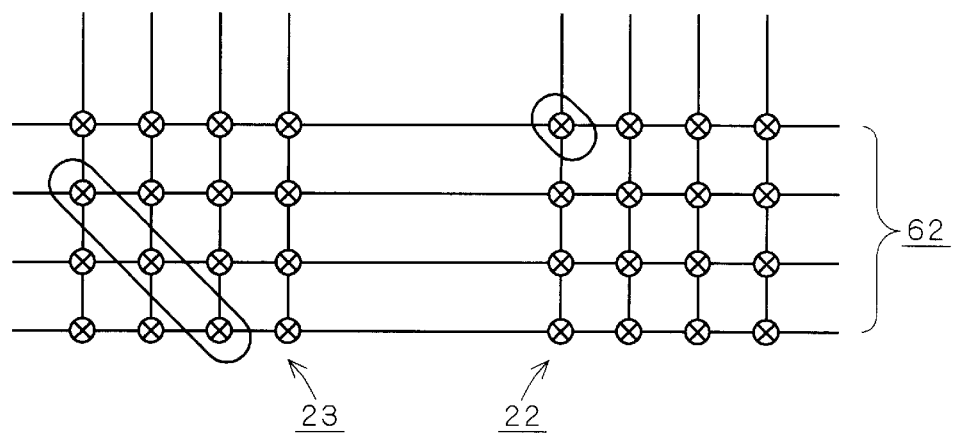

When the operand address OA specifies misaligned data in step S122, on the other hand, part of 4-word data specified by the operand address OA is not held in the data register. Thus, the value of the data register specified by the pointer register 266 and holding data stored at the end address is sent to the first switch group 23 (step S124) and the data stored at the head address which was read out from the data memory 4 in step S119 is sent to the second switch group 22. Then, the first and second switch groups 23, 22 are selectively turned on according to the operand address OA and the output of the third comparator 265 thereby to send misaligned data to the data path unit 3 (step S125). The processing from steps S101 to S125 can be performed in a single cycle. The operation of the first and second switch groups 23, 22 in step S125 is illustrated in FIGS. 45 to 47.

When the output of the third comparator 265 is a "mismatch" in step S118, neither of the two data registers 200, 201 holds data stored at the head address and data stored at the end address. Thus, the processing after step S103 is performed as in the case where the judgment result in step S102 is positive.

When the judgment result in step S113 is negative, both the two data registers 200, 201 hold valid data and thus which of them holds data stored at the head address is determined in step S126. When the output of the first comparator 261 is a "match" in step S126, the data register with the highest address holds data stored at the head address. When operand data is word-aligned data (step S127), this data register holds all 4-word data specified by the operand address OA. Thus, the value of the other data register than that specified by the pointer register 266, that is, the register holding data stored at the head address is sent to the first switch group 23 (step S128), and the second switch group 22 is turned off and the first switch group 23 is selectively turned on according to the operand address OA, whereby word-aligned data is sent to the data path unit 3 (step S129). The operation of the first switch group 23 in step S129 is illustrated in FIG. 41. The processing from steps S101 to S129 can be performed in a single cycle.

When operand data is misaligned data according to the judgment result in step S127, the two data registers 200, 201 holds part of data stored at the head address but do not hold data stored at the end address. Thus, data stored at the end address is read out from the data memory 4 (step S130) and the address register specified by the pointer register 266 and the corresponding data register are updated with the end address and the read data, respectively (step S131). Then, the value of another register specified by the pointer register 266, that is, the register holding data stored at the head address is supplied to the first switch group 23 (step S132), and the first and second switch groups 23, 22 are selectively turned on according to the operand address OA and the output of the third comparator 265 (step S133). The operation of the first and second switch groups 23, 22 in step S133 is illustrated in FIGS. 42 to 44. At this time, a register which has held data with the lowest address is updated with data stored at an address which is one address higher than the highest address held in the other register; therefore, the value of the leading pointer register 266 is updated to indicate another register than that which had been indicated (step S134). The processing from steps S101 to S134 can be performed in a single cycle.

When the output of the first comparator 261 is a "mismatch" in step S126, then whether the data register with the lowest address holds data stored at the head address is determined in step S135. When the judgment result in step S135 is positive, the data registers hold both data stored at the head address and data stored at the end address. Then, when the operand address OA specifies word-aligned data (step S136), the value of the data register specified by the pointer register 266 and holding data stored at the head address is supplied to the first switch group 23 (step S137), and the second switch group 22 is totally turned off and the first switch group 23 is selectively turned on according to the operand address OA, whereby word-aligned data is sent to the data path unit 3 (step S138). The operation of the first switch group 23 in step S138 is illustrated in FIG. 41. The processing from steps S101 to S138 can be performed in a single cycle.

Figure 48:
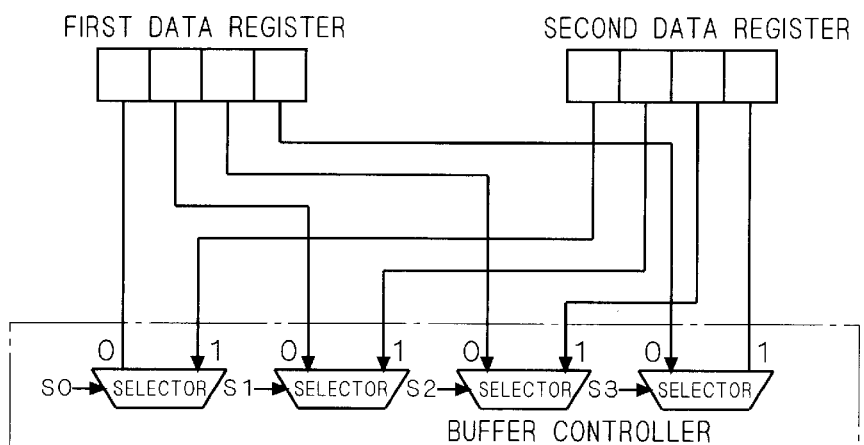
FIG. 48 is an explanatory diagram of the operation of the buffer controller of the third preferred embodiment.
Figure 49:
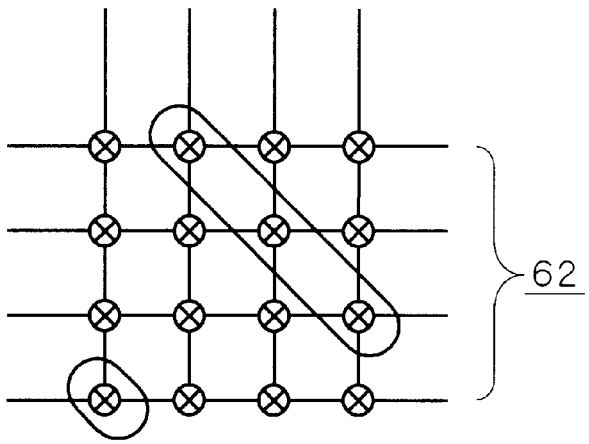
FIGS. 49 to 51 are explanatory diagrams of the operations of the data selector of the third preferred embodiment.
Figure 50:
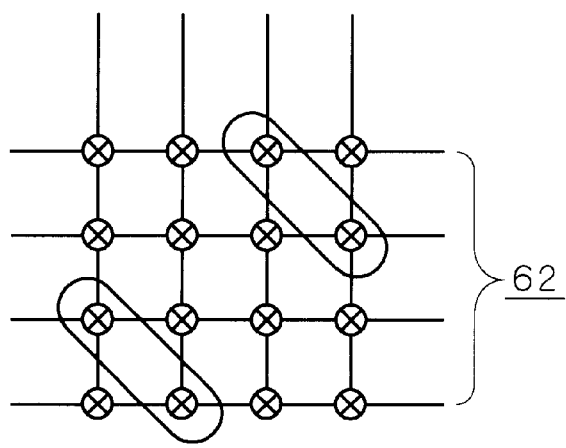
Figure 51:
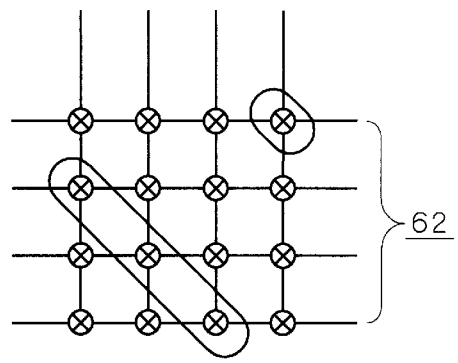

When the operand address OA specifies misaligned data (step S136), on the other hand, either of the values of the data register holding data stored the head address and the data register holding data stored at the end address is selected according to the operand address OA as shown in FIG. 48, and transferred to the first switch group 23 (step S139). Then, the second switch group 22 is totally turned off and the first switch group is selectively turned on according to the operand address OA, whereby misaligned data is sent to the data path unit 3 (step S140). The operation of the first switch group 23 in step S140 is illustrated in FIGS. 49 to 51. The processing from steps S101 to S140 can be performed in a single cycle.

As has been described, the alignment buffer 6 in the data processor of the third preferred embodiment comprises the first and second data registers 200, 201 to hold data stored at two addresses, wherein 4-word aligned/misaligned data specified by the operand address OA is selected from among a maximum of eight consecutive words of data held in the data registers and 4-word data read from the data memory 4, and outputted to the data path unit 3. Thus, when consecutive load instructions are executed with the increment or decrement size of not more than four words, only one access to the data memory should be enough for every four cycles, except in the case of the first load operation on misaligned data.

Accordingly, consecutive execution of load instructions holding misaligned data as operand data can be accomplished not only with a throughput of a single cycle as in the data processor of the first preferred embodiment, but also through a quarter of access times as compared to the data processor of the first preferred embodiment which requires one access to the data memory for every cycle. This saves power consumption in the data memory 4.

The store operation (step S3) should be performed in the same procedure as that of the first preferred embodiment (FIG. 19) or that of the second preferred embodiment (FIG. 29). In the procedure of FIG. 19, both the first and second data registers 200, 201 should be disabled by making invalid both the valid/invalid bits V of the first and second address registers 202, 203 in step S33.

In the procedure of FIG. 29, it should be judged in step S41 whether the higher-order 28 bits MA1 of the operand address OA matches either of the values of the first and second address registers 202, 203. Further, in step S43, the data to be written into the data memory 4 should also be written into the data register corresponding to the value-matched address register in step S41 (i.e., either of the first and second data registers 200, 201).

While the third preferred embodiment gives an example of the alignment buffers having two data registers, the present invention can also be applied to those having three data registers by the addition of a comparator. Broadly speaking, the present invention allows any number of data registers in the range of not less than 1. Furthermore, in the third preferred embodiment, judgments are made whether the address registers hold the head address or whether they hold the end address. This makes it possible to perform read operations with a throughput of a single cycle in whichever direction (i.e., plus or minus of the address register value) the operand address OA goes, as long as the increment or decrement size between the operand addresses OA is not more than four words.

Alternatively, it is also feasible to impose a restriction in such a manner that only when the operand address OA is updated in the direction indicated by the addressing-mode register 802 (FIG. 1), read operations can be performed with a throughput of a single cycle. This simplifies the control procedure by the buffer controller 26.

4. Fourth Preferred Embodiment

A data processor of a fourth preferred embodiment has two kinds of load instructions: the one which uses the address register 25 and the data register 24 included in the alignment buffer 6 (or 7), thereby permitting the reading of consecutive misaligned data with a throughput of a single cycle (the same as the read instruction of the first preferred embodiment); and the one which uses no data register (hereinafter referred to as an "aligned-data read instruction"). The aligned-data read instruction is an instruction for loading 4-word data aligned on the word boundary.

The data processor of the fourth preferred embodiment is identical to that of FIG. 1, and the alignment buffer 6 is identical to that of FIG. 2. When operand data access starts, the control unit 1 outputs a control signal indicating the type of instructions to the alignment buffers 6 and 7, which then operate in accordance with the control signal.

Figure 52:
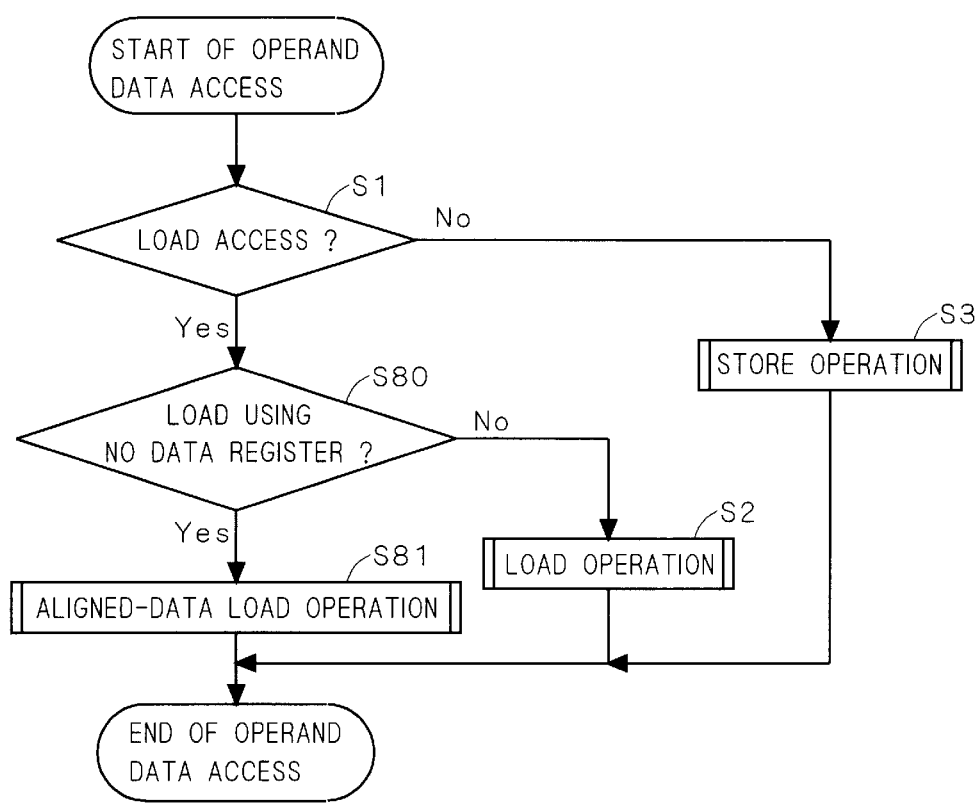
FIGS. 52 and 53 are flowcharts of the procedure of a buffer controller of a fourth preferred embodiment.

FIG. 52 is a flowchart of control procedures by the buffer controller 26 according to the fourth preferred embodiment. When operand data access starts, whether it is a load access or not is determined in step S1. For store access, the store operation is performed (step S3). The store operation in step S3 follows the same procedure as in FIG. 19 or 29. For load access, whether it is a load using the data register or not is determined (step S80). For loads using the data register, the same load operation as described in the first preferred embodiment is performed (step S2). For loads using no data register, an aligned-data load operation is performed (step S81). At the completion of either operation, the operand access process completes.

Figure 53:
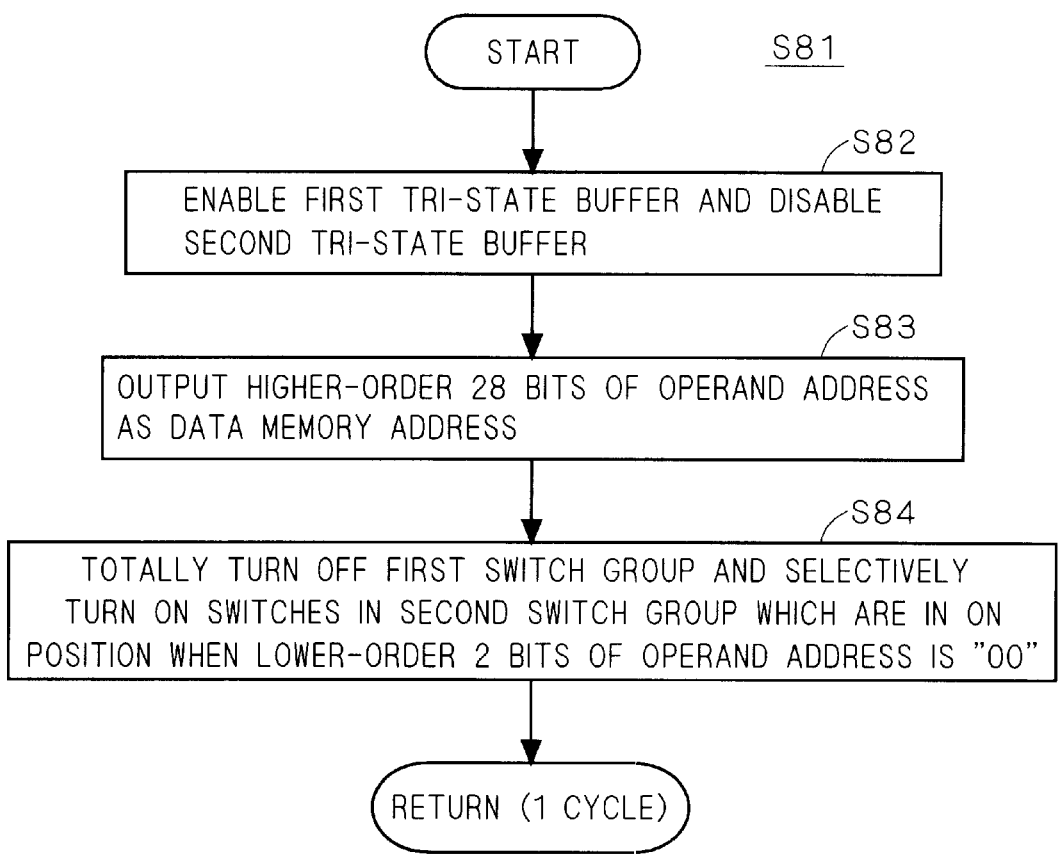

FIG. 53 is a flowchart of the aligned-data load operation (step S81). When the aligned-data load operation starts, the buffer controller 26 enables the first tri-state buffer 20 and disables the second tri-state buffer 21 (step S82).

Then, the higher-order 28 bits MA1 of the operand address OA is outputted as the data memory address MA (step S83), and the first switch group 23 is totally turned off and the second switch group 22 is selectively turned on in accordance with the readout of word-aligned data, whereby the read data (word-aligned data) is sent to the data bus 62 through the second switch group 22 (step S84). The operation of the first and second switch groups 23, 22 in step S84 is identical to that in the case where the lower-order two bits U of the operand address OA are 2'b00 in the load operation (cf. FIGS. 20, 21). The processing in step S81 can be performed in a single cycle. The values of the data register 24 and the address register 25 are not updated.

In the data processor of the first preferred embodiment, if the operand address OA jumps and other memory space in the data memory 4 is read during execution of the load operation on contiguous operand addresses OA, the value of the data register 24 will be updated. Thus, when the load operation restarts after interruption, the first operation immediately after the restart requires two cycles since the value of the data register 24 has been updated with data at another address.

On the other hand, the data processor of the fourth preferred embodiment can prevent such updating of the data register 24 by executing the aligned-data read instruction using no data register 24 when a load to other memory space is required during execution of the load operation on contiguous operand addresses OA. Thus, the first operation after the restart of the read instruction can be performed in a single cycle. This improves processing speed.

5. Fifth Preferred Embodiment

A data processor of a fifth preferred embodiment differs from that of the first preferred embodiment in its characteristic that it has a load instruction (hereinafter referred to as a "single-word parallel load instruction") for loading 1-word data stored in the data memory 4 (or 5), which is specified by the operand address OA, in parallel as 4-word data into the data path unit 3.

The data processor of the fifth preferred embodiment is identical to that in FIG. 1, and the alignment buffer 6 is identical to that in FIG. 2. When operand data access starts, the control unit 1 outputs a control signal indicating the type of instructions to the alignment buffers 6 and 7, which then operate in accordance with this control signal.

FIG. 54 is a flowchart of control procedures by the buffer controller 26 according to the fifth preferred embodiment. When operand data access starts, whether it is a load access or not is determined in step S1. For store access, the store operation is performed (step S3). The store operation in step S3 follows the same procedure as in FIG. 19 or 29. For load access, whether it is an access according to the single-word parallel load instruction or not is determined (step S90). For load access not following the single-word parallel load instruction, the same load instruction as described in the first preferred embodiment is performed (step S2). For load access according to the single-word parallel load instruction, a single-word parallel load operation is performed (step S91). At the completion of either operation, the operand access process completes.

Figure 55:
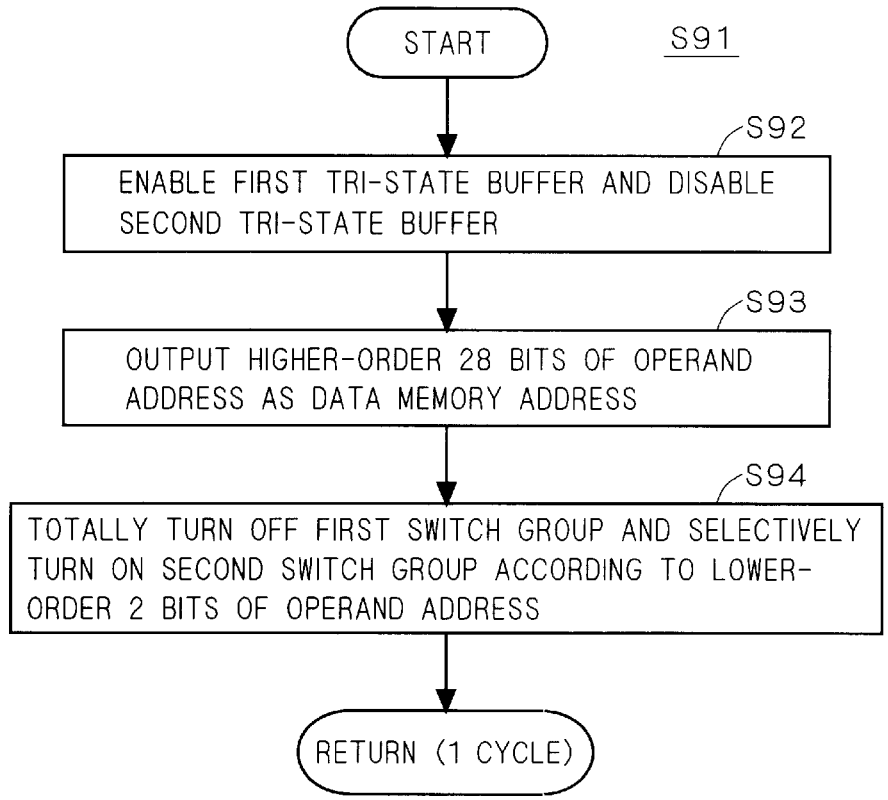
Figure 56:
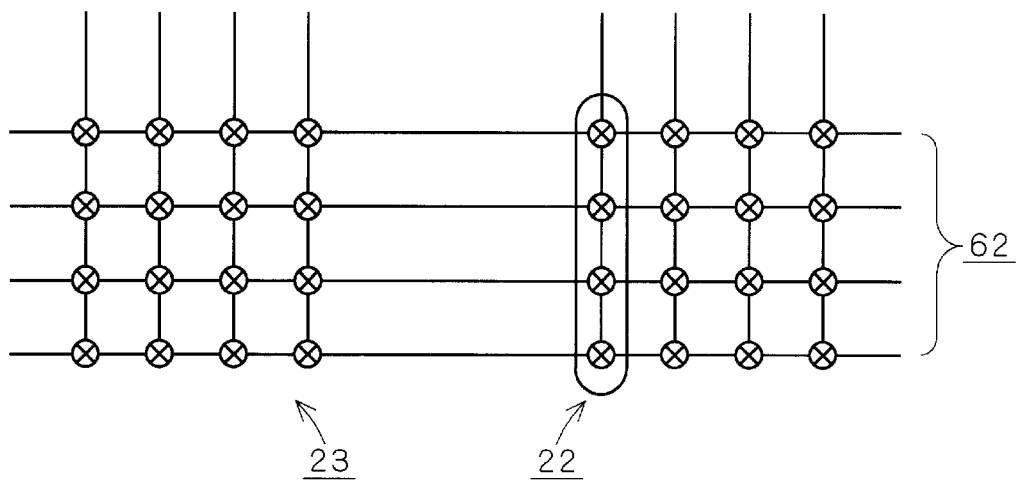
Figure 57:
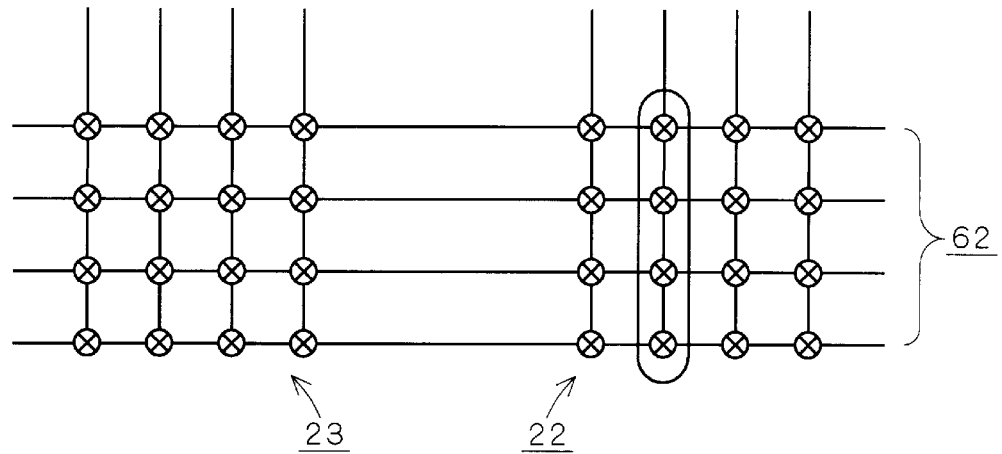
Figure 58:
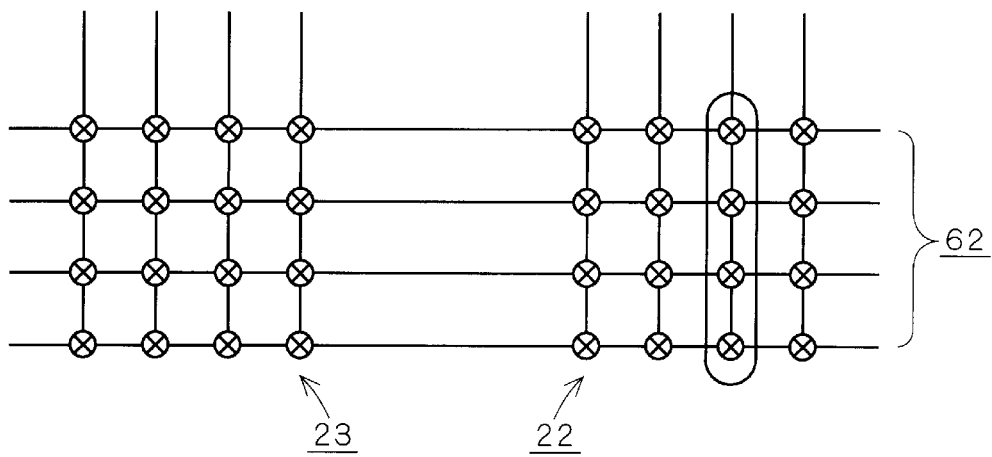

FIG. 55 is a flowchart of the single-word parallel load instruction (step S91). When the single-word parallel load operation starts, the buffer controller 26 enables the first tri-state buffer 20 and disables the second tri-state buffer 21 (step S92).

Then, the higher-order 28 bits MA1 of the operand address OA is outputted as the data memory address MA (step S93), and the first switch group 23 is turned off and the second switch group 22 is selectively turned on according to the lower-order two bits U of the operand address OA (step S94). Accordingly, only one word specified by the lower-order two bits U of the operand address OA is selected from the 4-word read data, and the selected one word is sent in parallel as 4-ward data through the second switch group 22 to the data bus 62.

The operation of the first and second switch groups 23, 22 in step S94 is illustrated in FIGS. 56 to 59. In FIGS. 56 to 59, only the switches in the ellipse are in the ON position and the others in the OFF position. The processing in step S91 can be performed in a single cycle.

Figure 60:
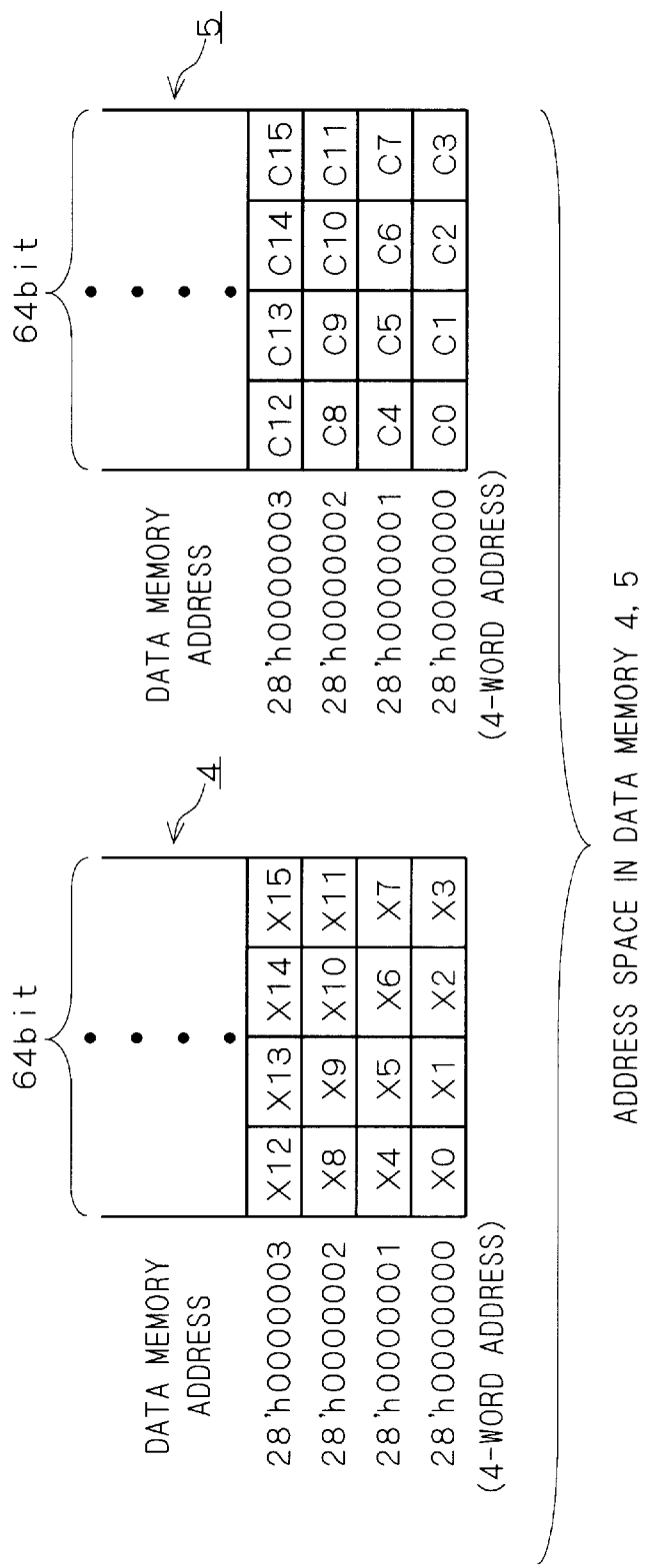
FIG. 60 is an explanatory diagram of data in data memory of the fifth preferred embodiment.

When the data processor of the fifth preferred embodiment is used as a FIR filter, the data X and the coefficients C are stored in the space in the data memories 4, 5 as shown in FIG. 60. In the first preferred embodiment, each of the coefficients C has to be stored at four locations, unlike the data X, as shown in FIG. 28. On the other hand, the data processor of the fifth preferred embodiment can read out any one word in parallel as 4-word data by using the single-word load instruction, so each of the coefficients C only has to be stored at one location in the data memory 5 as shown in FIG. 60. That is, the data processor of the fifth preferred embodiment as a FIR filter can reduce the capacity of the data memory 5 to a quarter as compared to that of the first preferred embodiment, thereby saving data memory.

6. Sixth Preferred Embodiment

In the data processor of the first preferred embodiment, the buffer controller 26 increments the operand address OA and uses the result for comparison with the address register in the same cycle and generation of the data memory address MA. If the data processor of the first preferred embodiment operates at higher speed, there is a possibility that a series of operations from the output of the operand address OA by the operand-address generation unit 8, 9 to the reading of data from the data memories 4, 5 including the generation of the data memory address MA, may not work in a single cycle.

Figure 61:
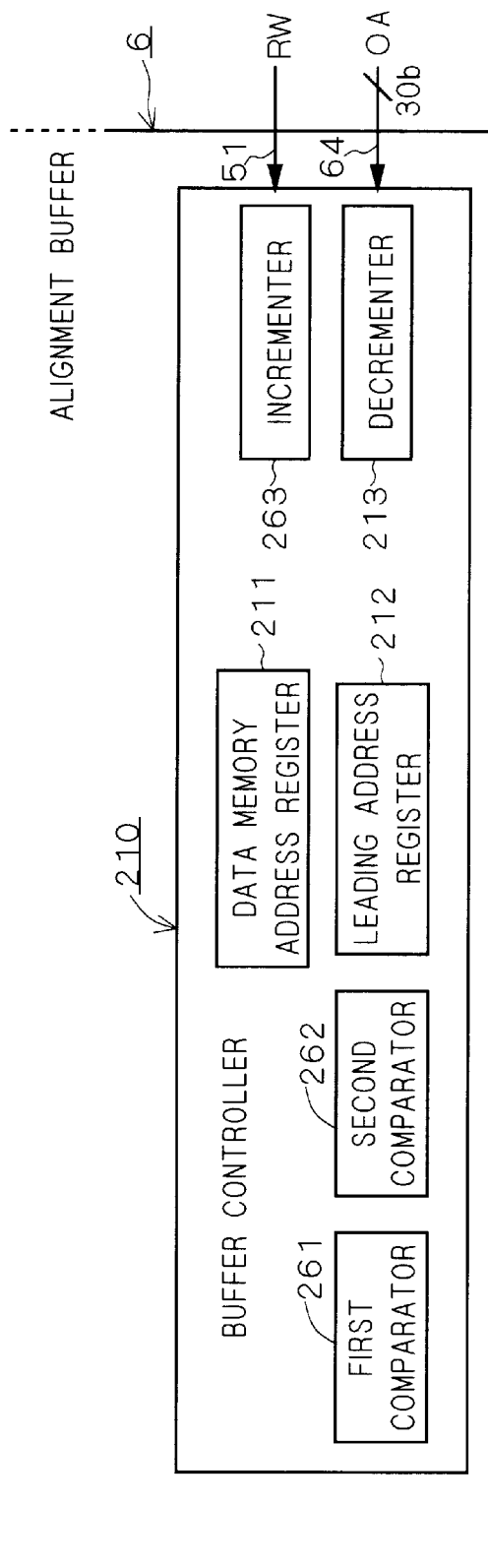
FIG. 61 is a partial block diagram of an alignment buffer of a sixth preferred embodiment.

In a data processor of a sixth preferred embodiment, the alignment buffer 6, part of which is shown in FIG. 61, comprises a buffer controller 210 having a data memory address register 211. When the address register 25 is updated, this data memory address register 211 is also updated with the update value of the address register 25 plus one. Thus, the data memory address register 211 always holds the value held by the address register 25 plus one.

In the sixth preferred embodiment, either of the value of the data memory address register 211 and the lower-order 28 bits MA1 of the operand address OA is selected and outputted as the data memory address MA. This saves processing time required for the add operation in the first preferred embodiment.

Further, concurrently with the updating of the address register 25, the update value of the address register 25 minus one is stored in a leading address register 212 in the buffer controller 210. A decrementer 213 is provided for this subtraction. The value of the leading address register 212 is fed to one input of the second comparator 262 instead of the lower-order 28 bits MA3 of the value of the address register 25 used in the first preferred embodiment. The other input of the second comparator 262 receives the operand address OA itself instead of the operand address OA plus one used in the first preferred embodiment. With these values, the second comparator 262 can output the same result as in the first preferred embodiment. Further, as compared with the first preferred embodiment, the time required for the second comparator 262 to obtain the comparison result is reduced by the time for add operation. The alignment buffer 6 of the sixth preferred embodiment is identical to that of the first preferred embodiment in FIG. 2 except for the part in FIG. 61.

Figure 15:
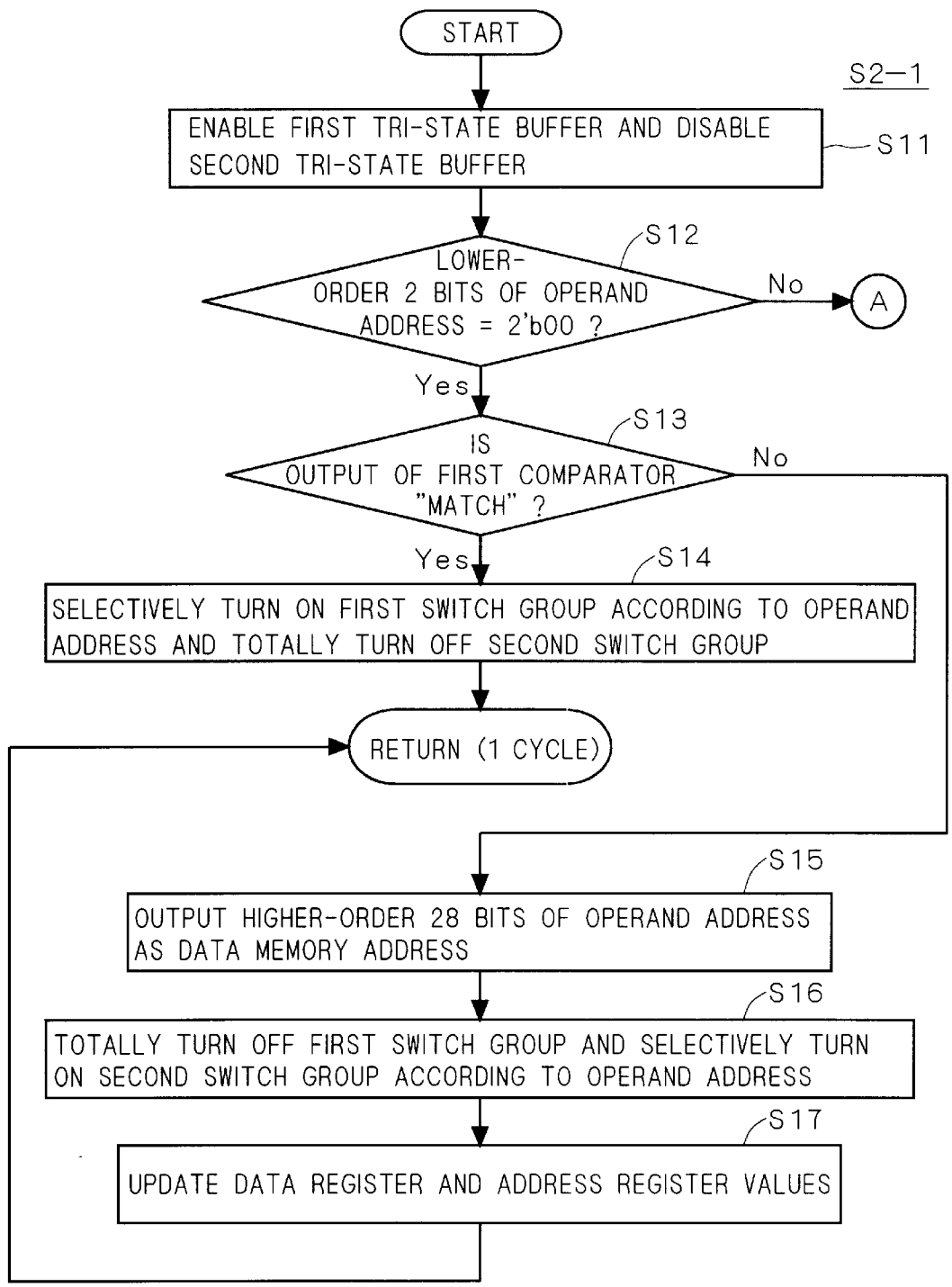
Figure 16:
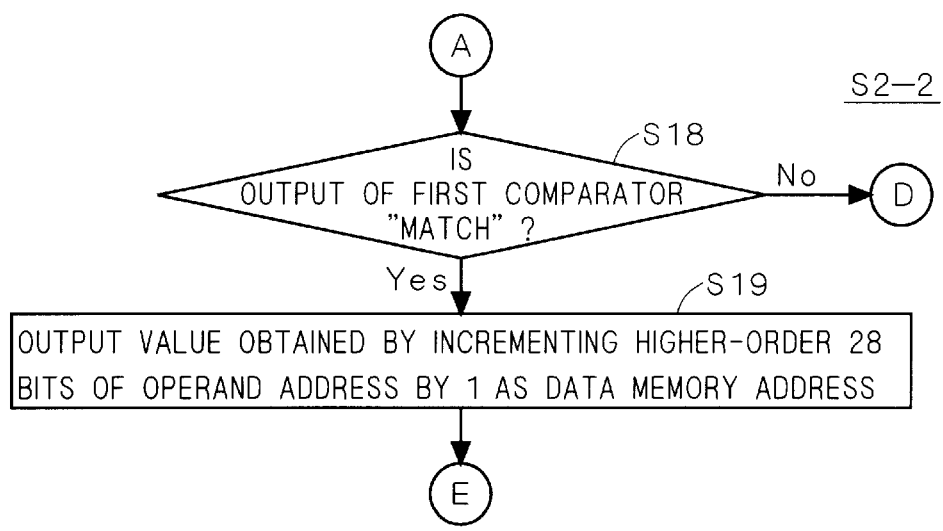
Figure 17:
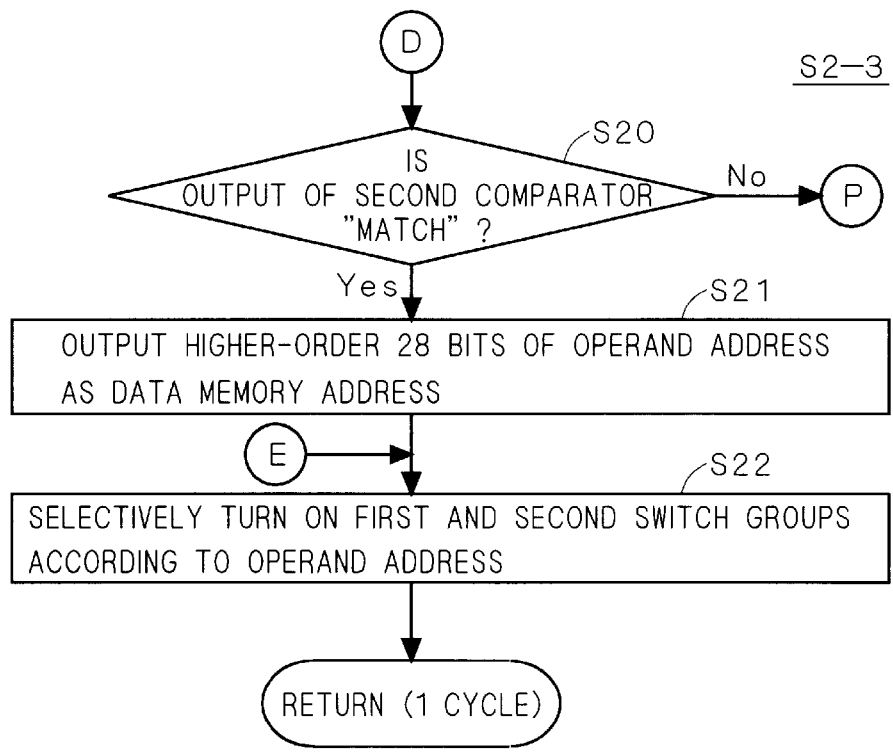
Figure 62:
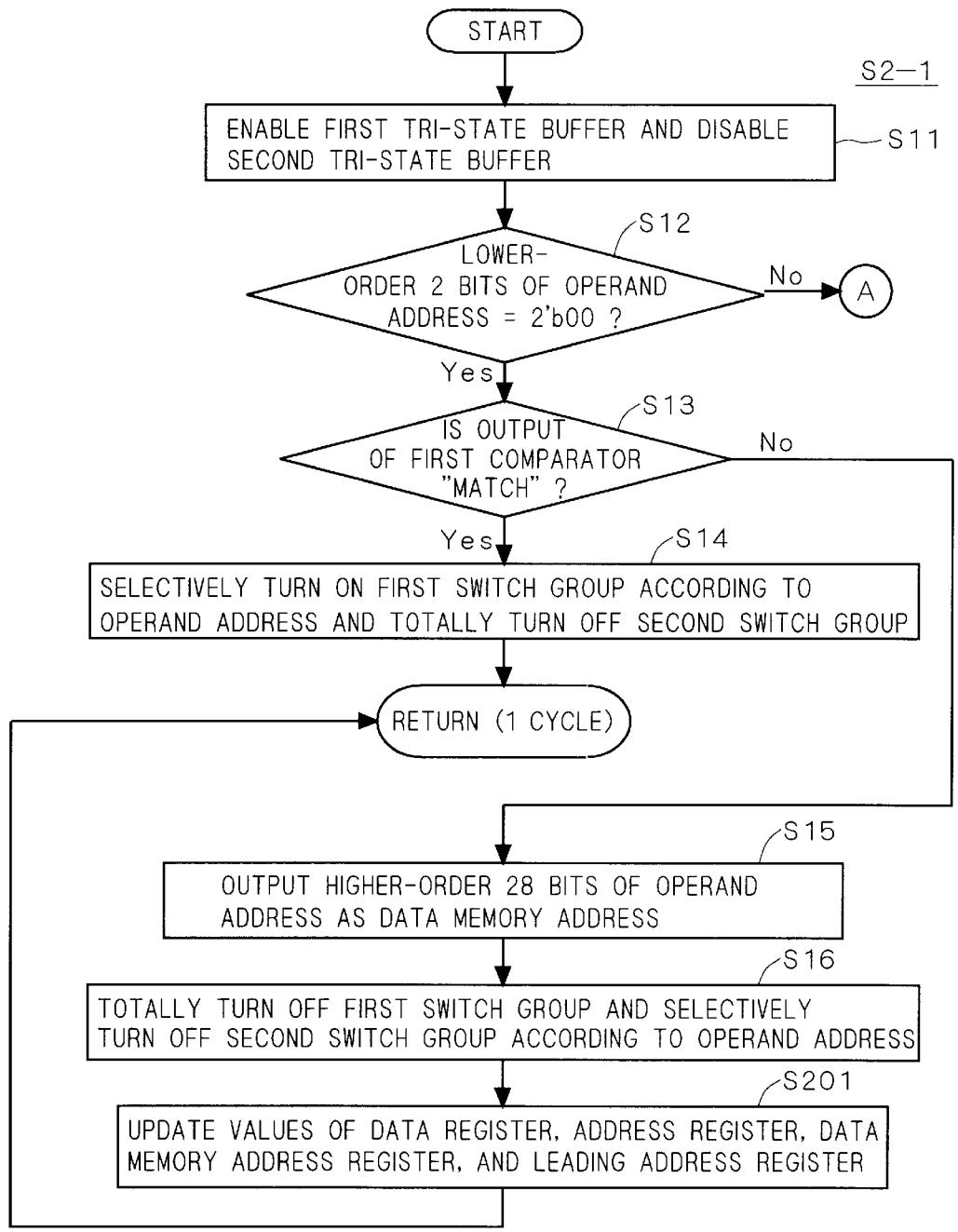
FIGS. 62 to 64 are flowcharts of the procedure of a buffer controller of the sixth preferred embodiment.
Figure 63:
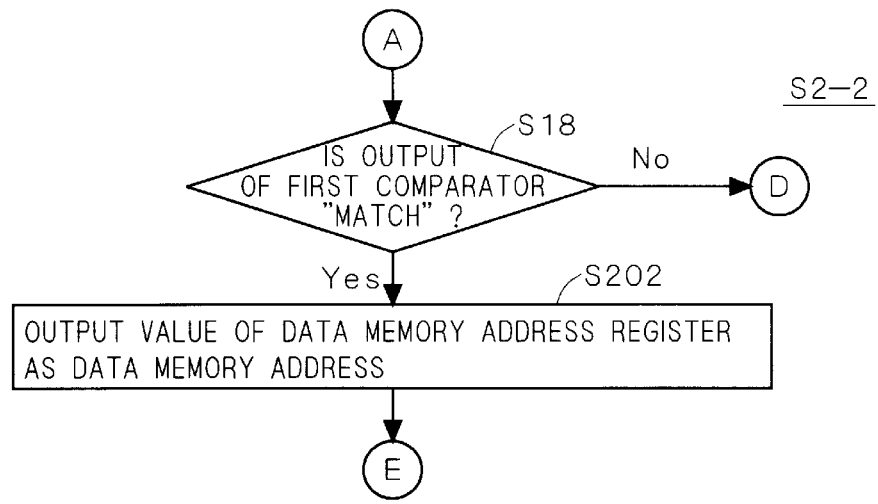
Figure 64:
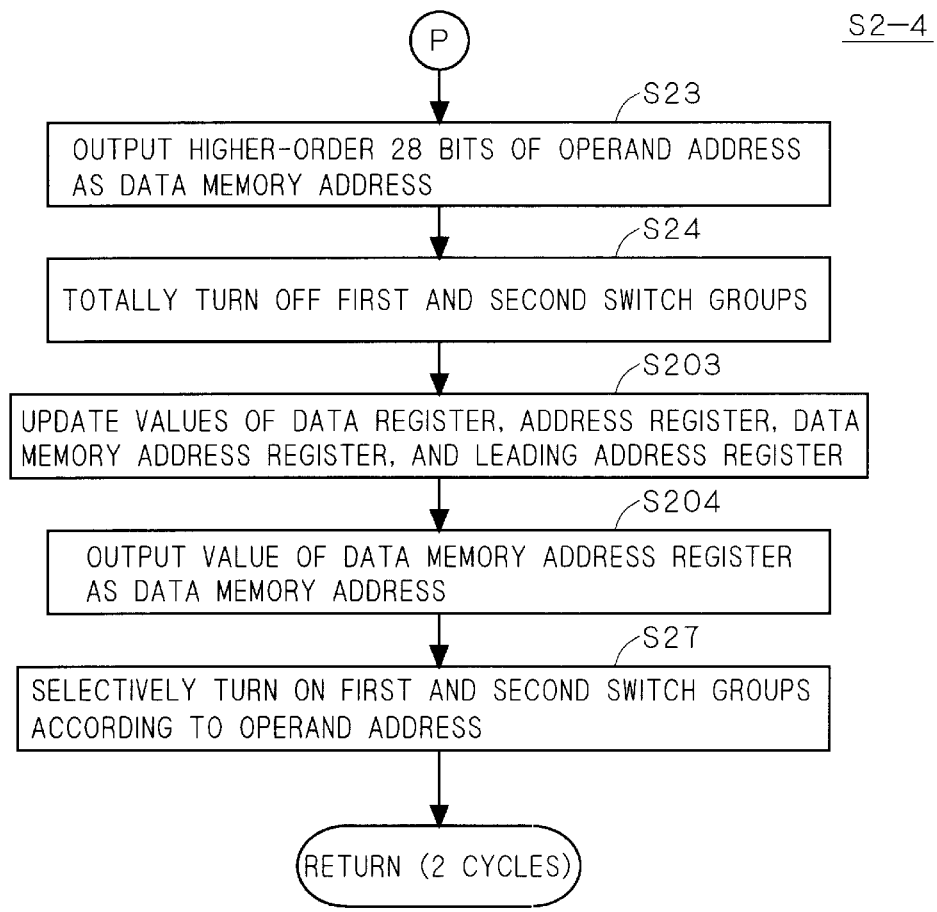
Figure 65:
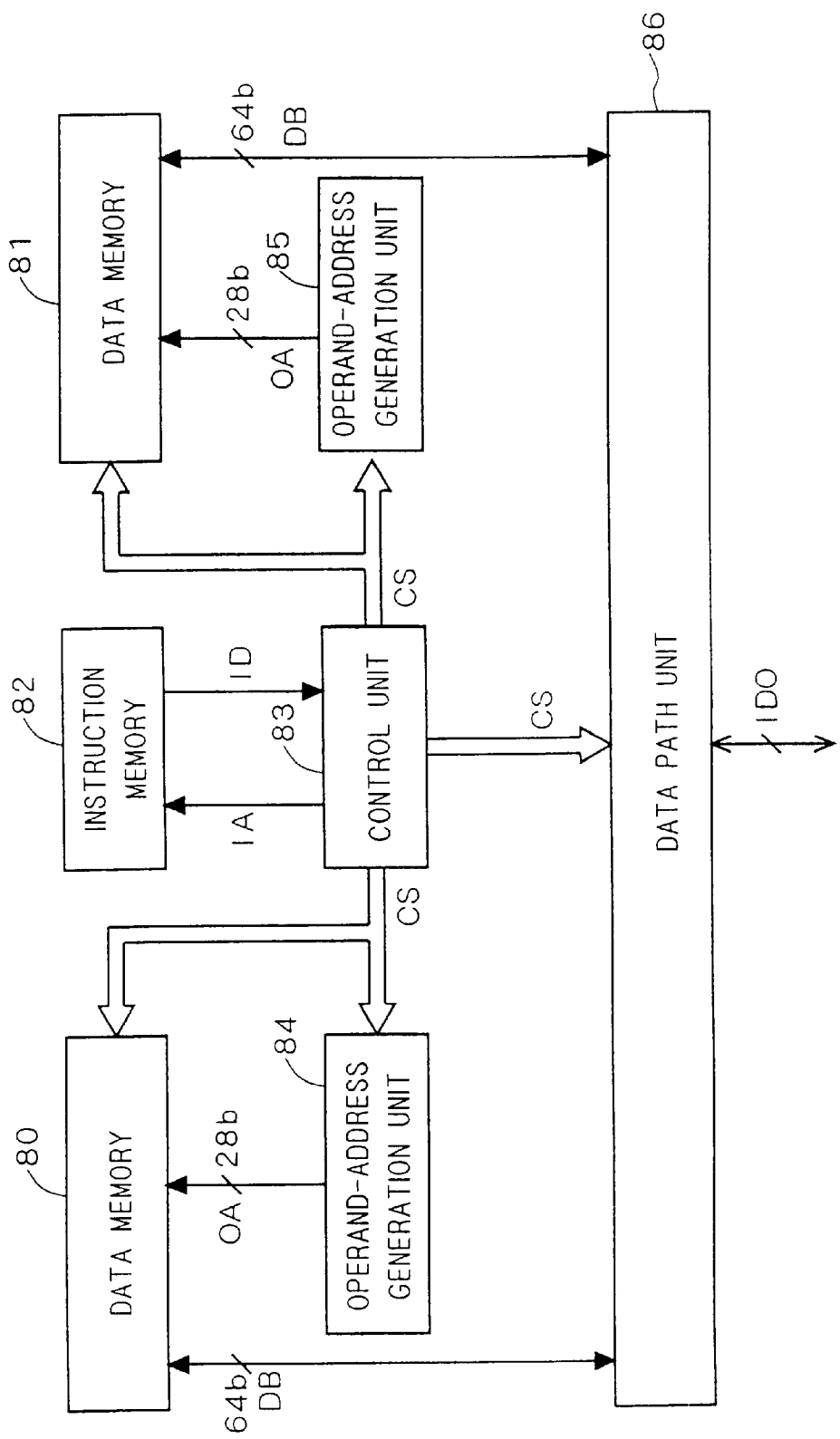
FIG. 65 is a block diagram of a data processor of the background art.

The buffer controller 210 of the sixth preferred embodiment follows the same procedure as the buffer controller 26 of the first preferred embodiment, with the exception that FIGS. 15, 16, and 18 are replaced with FIGS. 62, 63, and 64, respectively The procedure of FIG. 62 is identical to that of FIG. 15 except that, in step S17, not only the values of the data register 24 and the address register 25 but also the values of the leading address register 212 and the data memory address register 211 are updated (step S201). The procedure of FIG. 63 is identical to that of FIG. 16 except that, in step S19, the value of the data memory address register 211 is outputted as the data memory address MA (step S202). The procedure of FIG. 64 is identical to that of FIG. 18 except that, in step S25, not only the values of the data register 24 and the address register 25 but also the values of the leading address register 212 and the data memory address register 211 are updated (step S203) and that, in step S26, the value of the data memory address register 211 is outputted as the data memory address MA (step S204).

In this fashion, the add operation on address which is necessary to control the calculation and output of the data memory address MA is performed before the start of a cycle. This shortens the time required to read out data from the data memories 4, 5.

The characteristic configuration of the sixth preferred embodiment is also applicable to the data processor of the third preferred embodiment. In this case, the data memory address register 211 is controlled to have the higher address of the effective data registers 200, 201 plus one. Also, the leading address register 212 is controlled to have the lower address of the effective data registers 200, 201 minus one. This shortens the time required to read out data from the data memories 4, 5 as in the first preferred embodiment.

7. Modification

While FIG. 2 of the second preferred embodiment is used as the block diagram of the alignment buffer 6 of the fifth preferred embodiment which performs the single-word parallel load operation, the configuration of the alignment buffer 6 can be simplified if the load operation in step S2 is unnecessary in the flowchart of FIG. 54. In such a case, the first switch group 23, the data register 24, and the address register can be deleted from FIG. 2. Besides, the first comparator 261, the second comparator 262, and the incrementer 263 can be deleted since the buffer controller 26 only needs to output the data memory address MA based on the operand address OA.

While the invention has been shown and described in detail, the foregoing description is in all aspects illustrative and not restrictive. It is therefore understood that numerous modifications and variations can be devised without departing from the scope of the invention.

What is claimed is:

1. A data processor receiving data from a memory, said memory being capable of storing N ($\geq 2$) words of data at each address, said data processor comprising:

M ($\geq 1$) register devices, each configured to hold an address and N words of data;

a selector configured to select and output N consecutive words of requested data specified on a word-by-word basis from among (1) data held in said M register devices, and (2) data read from said memory; and a controller configured (1) to determine whether said N consecutive words of requested data have a portion that is not held in any of said M register devices and, if so, to read out N words of data that includes said portion from said memory, and (2) to determine whether said M register devices include a free register device, which does not hold any of said N consecutive words of requested data, and, if so, to update said free register device with said N words of data read from said memory and with a corresponding address.

2. The data processor according to claim 1, wherein said M register devices include at least two register devices.

3. The data processor according to claim 1, wherein said controller writes N words of data into said memory at a specified address in response to a write instruction and disables each of said M register devices so that each of said M register devices are equivalent to register devices that do not hold address and data correspondingly held in said memory.

4. The data processor according to claim 1, wherein said controller writes N words of data into said memory at a specified address in response to a write instruction and, when said M register devices includes a register device holding said specified address, updates N words of data held in the register device with said N words of data written into said memory.

5. The data processor according to claim 1, wherein said controller reads out N words of data stored at a specified address in said memory, in response to an aligned-data read instruction; and
said selector outputs said N words of data read from said memory in response to said aligned-data read instruction.

6. The data processor according to claim 1, wherein said controller reads out N words of data containing a specified word from said memory, in response to a single-word parallel read instruction; and
said selector outputs N words in parallel, each word being said specified word included in said N words of data read from said memory, in response to said single-word parallel read instruction.

7. The data processor according to claim 1, wherein said controller includes another register device, and, when updating a value of one of said M register devices, computes an address contiguous to an address to be held in an updated register and loads the computed address into said another register device.

8. The data processor according to claim 1, configured to receive data from a second memory capable of storing N ($\geq 2$) words of data at each address, said data processor further comprising:
- a second M ($\geq 1$) register devices, each being capable of holding an address of said second memory and N words of data;
- a second selector configured to select and output a second N consecutive words of requested data specified on a word-by-word basis from among data held in said second M register devices and data read from said second memory;
- a second controller configured (1) to determine whether said second N consecutive words of requested data have a second portion that is not held in any of said second M register devices, and, if so, to read out N words of data that includes said second portion from said second memory, and (2) to determine whether said second M register devices include a free register device, which does not hold any of said second N consecutive words of requested data, and, if so, to update said free register device with said N words of data read from said second memory and with a corresponding address; and
- an operation unit for performing an arithmetic or logic operation using both data output from said selector and said second selector.

9. The data process or of claim 1, wherein each of said M register devices includes a data register holding N words of data and an address register holding an address.

10. The data processor of claim 9, wherein said M register devices include at least two register devices.

11. A data processor receiving data from a memory, said memory being capable of storing N ($\geq 2$) words of data at each address, said data processor comprising:
- a controller configured to read out N words of data, stored at an address and including a specified word, from said memory; and
- a selector configured to output N words in parallel, each word being said specified word included in said N words of data read from said memory.

* * * * *